United States Patent
Lee et al.

(10) Patent No.: US 9,936,448 B2
(45) Date of Patent: Apr. 3, 2018

(54) METHOD FOR TRANSMITTING AND RECEIVING DATA IN WIRELESS COMMUNICATION SYSTEM AND APPARATUS FOR PERFORMING THE SAME

(71) Applicant: LG ELECTRONICS INC., Seoul (KR)

(72) Inventors: Minsoo Lee, Seoul (KR); Younghwan Kwon, Seoul (KR); Jaeho Lee, Seoul (KR); Hyeonjae Lee, Seoul (KR); Jangwoong Park, Seoul (KR); Seungryul Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 15/035,082

(22) PCT Filed: Nov. 3, 2014

(86) PCT No.: PCT/KR2014/010417
§ 371 (c)(1),
(2) Date: May 6, 2016

(87) PCT Pub. No.: WO2015/068988
PCT Pub. Date: May 14, 2015

(65) Prior Publication Data
US 2016/0278006 A1    Sep. 22, 2016

Related U.S. Application Data

(60) Provisional application No. 61/900,948, filed on Nov. 6, 2013, provisional application No. 61/992,875, filed on May 13, 2014.

(51) Int. Cl.
*H04W 48/18* (2009.01)
*H04W 12/00* (2009.01)
(Continued)

(52) U.S. Cl.
CPC ......... *H04W 48/18* (2013.01); *H04L 67/306* (2013.01); *H04W 4/008* (2013.01); *H04W 12/00* (2013.01);
(Continued)

(58) Field of Classification Search
None
See application file for complete search history.

(56) References Cited

U.S. PATENT DOCUMENTS

| 9,319,828 B2 * | 4/2016 | Decuir ................ H04W 4/008 |
| 2004/0087274 A1 * | 5/2004 | Ekberg ................ H04W 48/16 455/41.2 |

(Continued)

FOREIGN PATENT DOCUMENTS

| KR | 10-2012-0024065 A | 3/2012 |
| KR | 10-2012-0052549 A | 6/2012 |

(Continued)

*Primary Examiner* — Anh Ngoc Nguyen
(74) *Attorney, Agent, or Firm* — Birch, Stewart, Kolasch & Birch, LLP

(57) ABSTRACT

A method for transmitting and receiving data in a wireless communication system, performed by a first device, includes transmitting a first message including device connection information to at least one second device via a first network, receiving a response with respect to the first message from the at least one second device via the first network, transmitting a connection request message for requesting wireless connection of a second network to the at least one second device via the first network on the basis of the response, the connection request message including information regarding connection of a network indicating the second network, receiving a connection response message corresponding to a response with respect to the connection request message from the at least one second device via the first network, and transmitting and receiving data to and from a second device via the second network.

18 Claims, 31 Drawing Sheets

(51) Int. Cl.
*H04W 76/02* (2009.01)
*H04L 29/08* (2006.01)
*H04W 4/00* (2018.01)
*H04W 12/04* (2009.01)
*H04W 72/12* (2009.01)
*H04W 84/12* (2009.01)

(52) U.S. Cl.
CPC ....... *H04W 12/04* (2013.01); *H04W 72/1215* (2013.01); *H04W 76/02* (2013.01); *H04W 84/12* (2013.01)

(56) References Cited

U.S. PATENT DOCUMENTS

| | | | |
|---|---|---|---|
| 2007/0037517 | A1 | 2/2007 | Camuffo et al. |
| 2012/0124400 | A1 | 5/2012 | Yoon |
| 2012/0195387 | A1* | 8/2012 | Masuda .............. H04M 1/7253 375/259 |
| 2012/0214414 | A1 | 8/2012 | Abel et al. |
| 2014/0302849 | A1* | 10/2014 | Palin .................... H04W 8/005 455/436 |

FOREIGN PATENT DOCUMENTS

| | | |
|---|---|---|
| KR | 10-2012-0117910 A | 10/2012 |
| KR | 10-2013-0027876 A | 3/2013 |

* cited by examiner

【Figure 1】
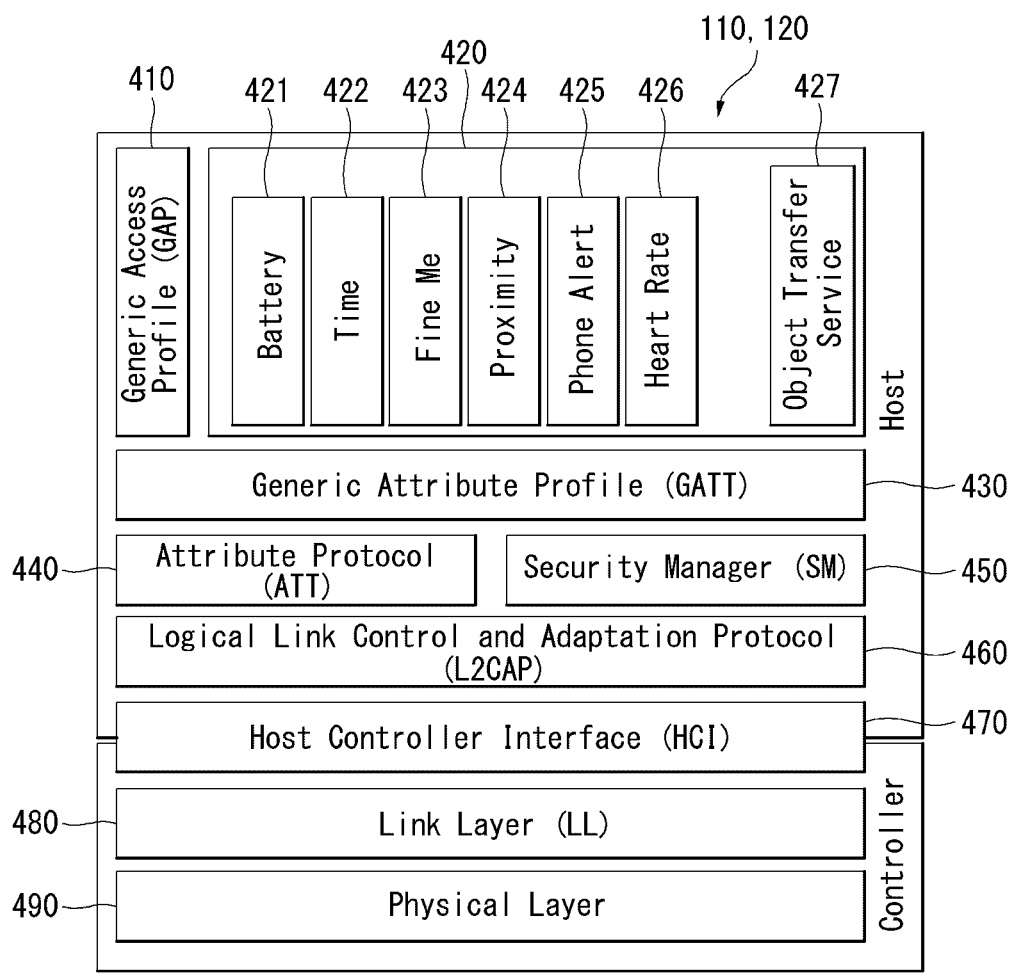

[Figure 2]
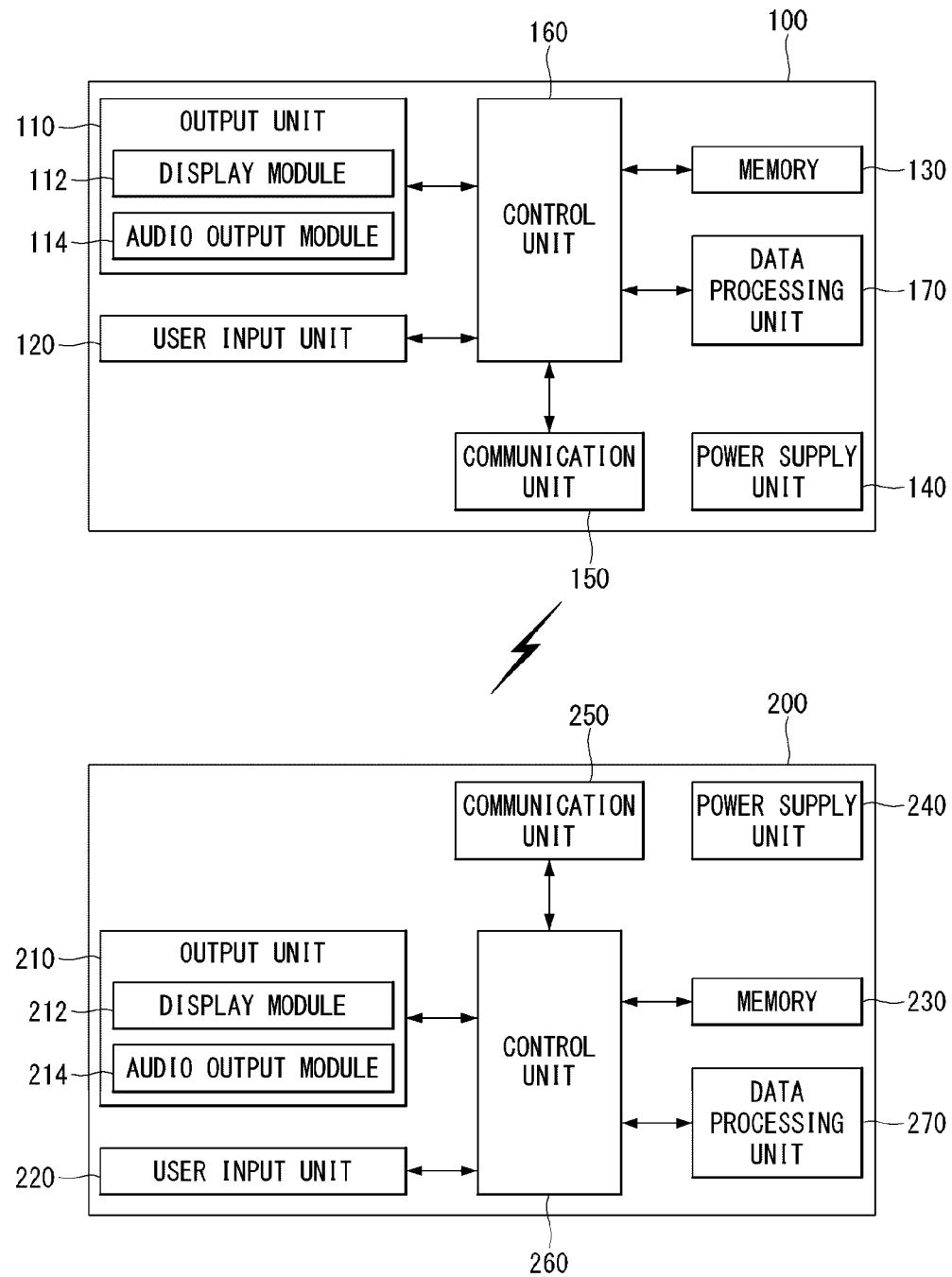

[Figure 3]
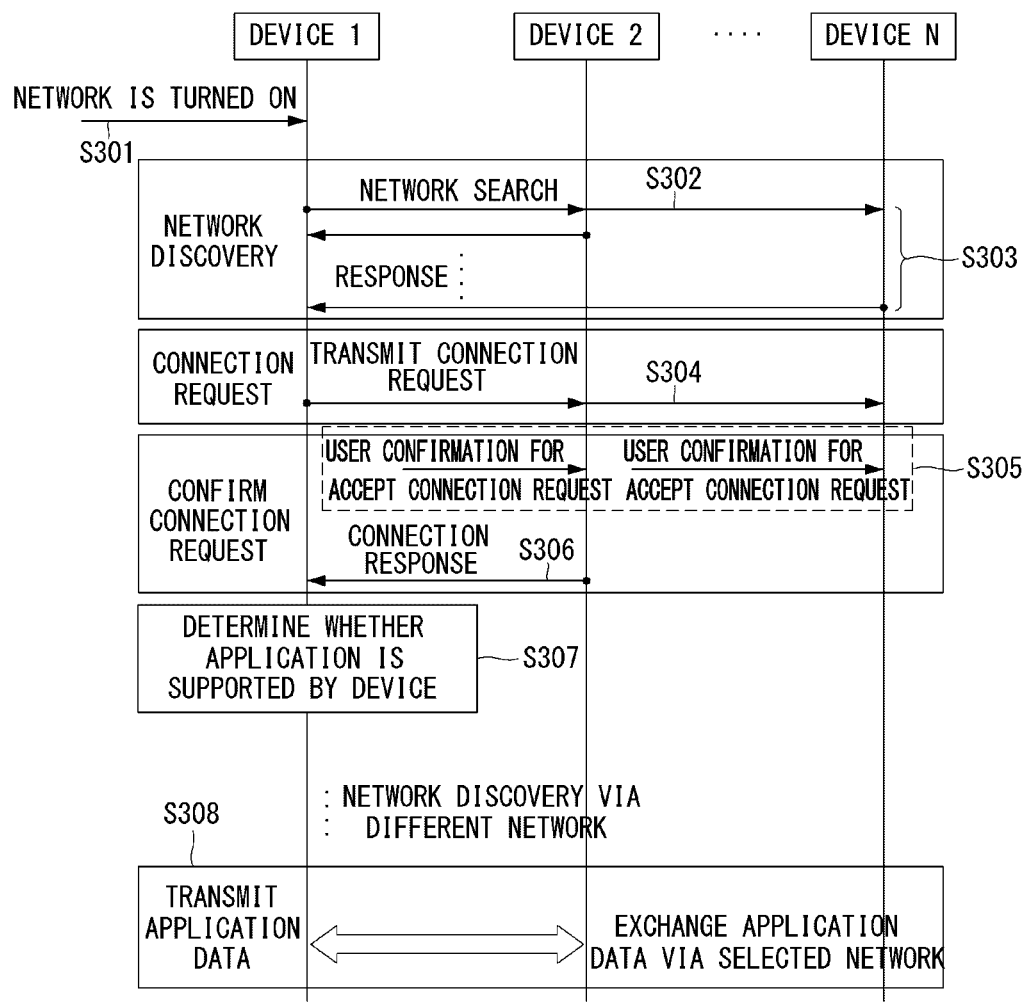

[Figure 4]
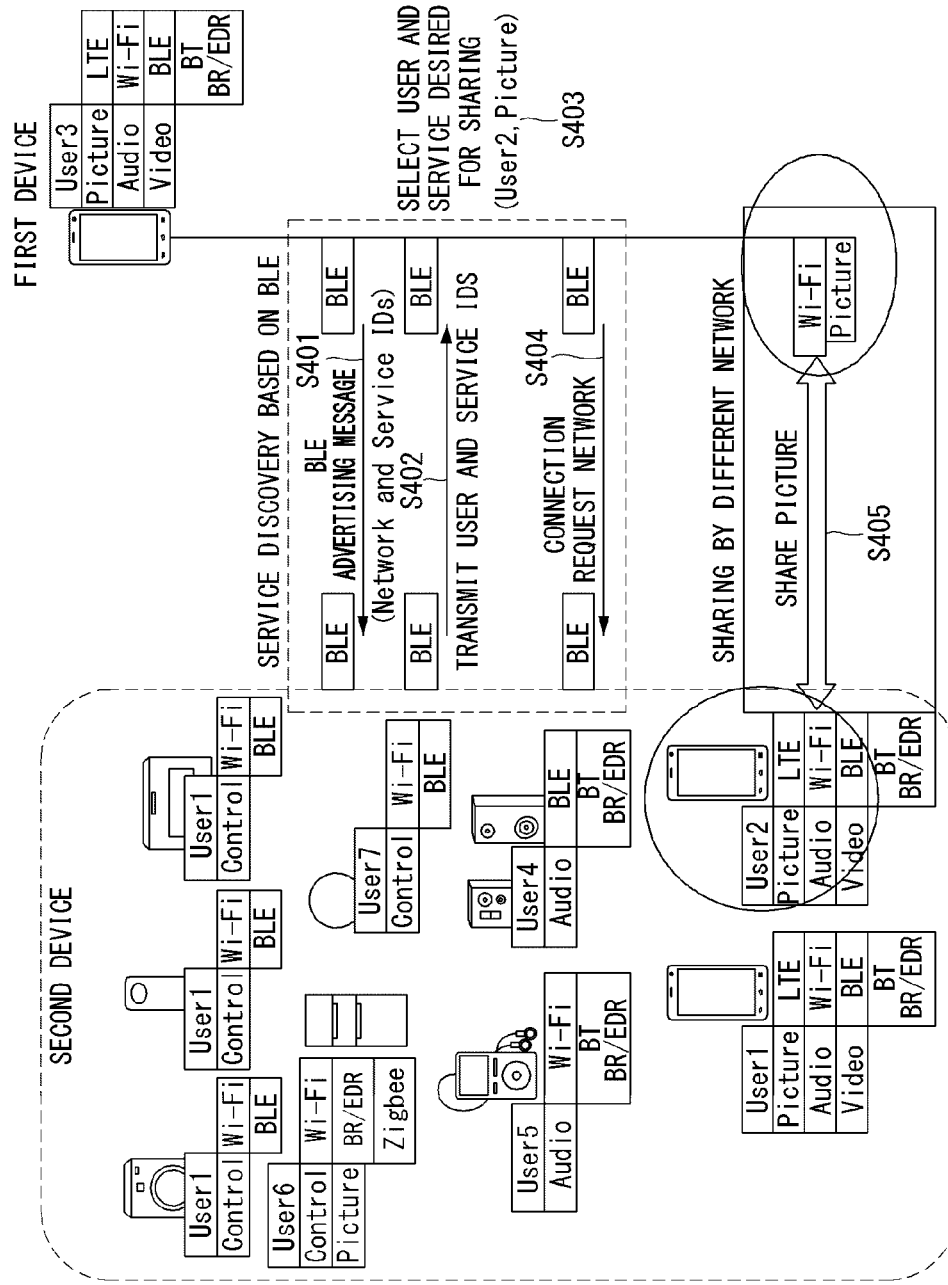

[Figure 5]
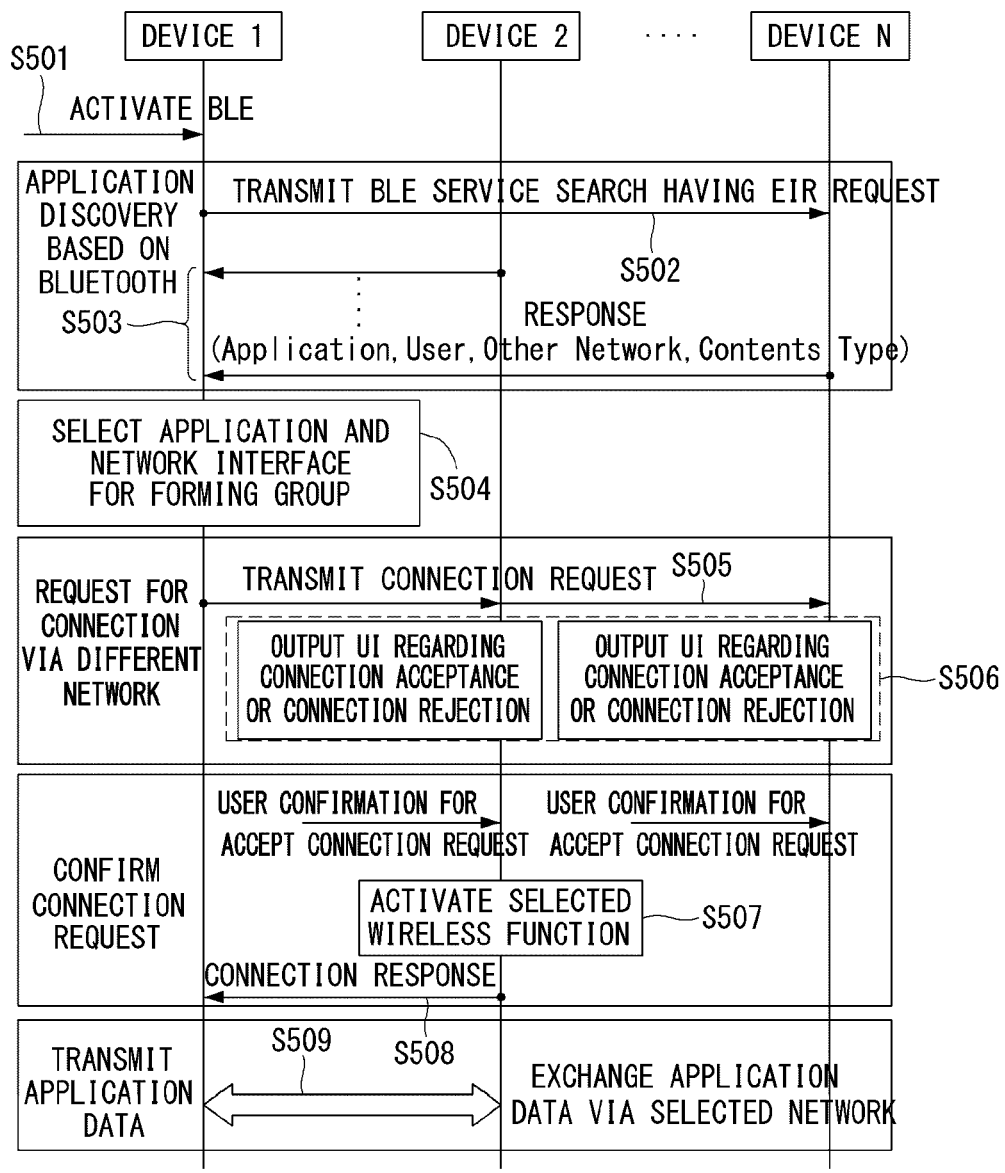

【Figure 6】
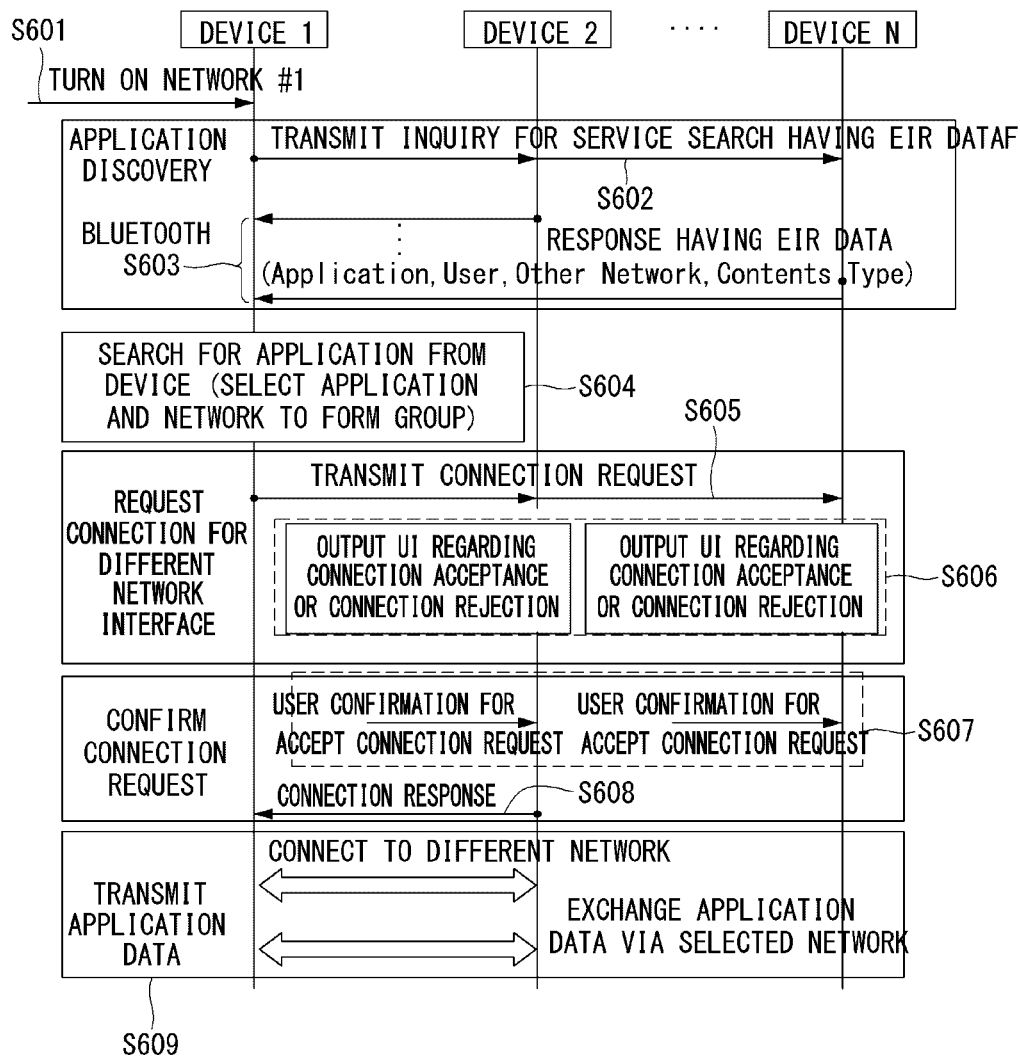

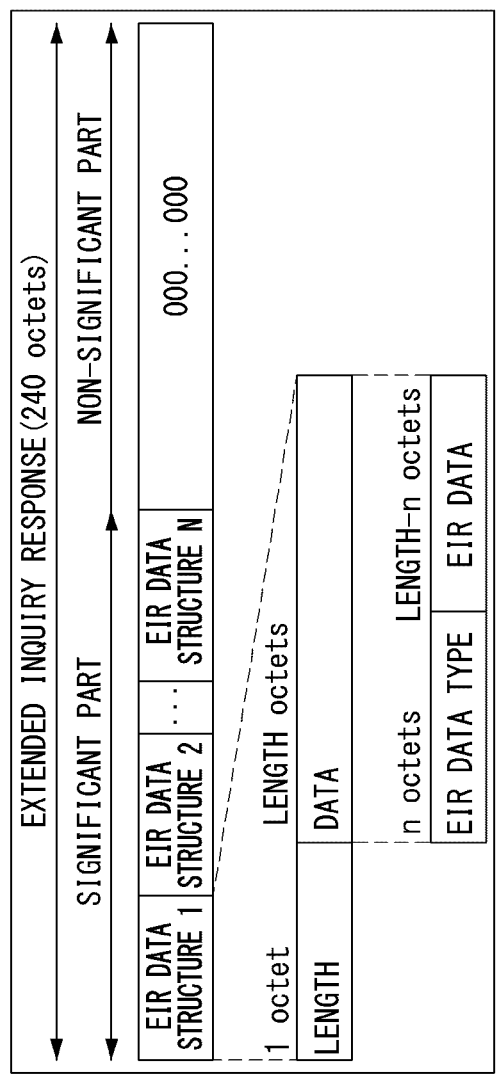
[Figure 7]

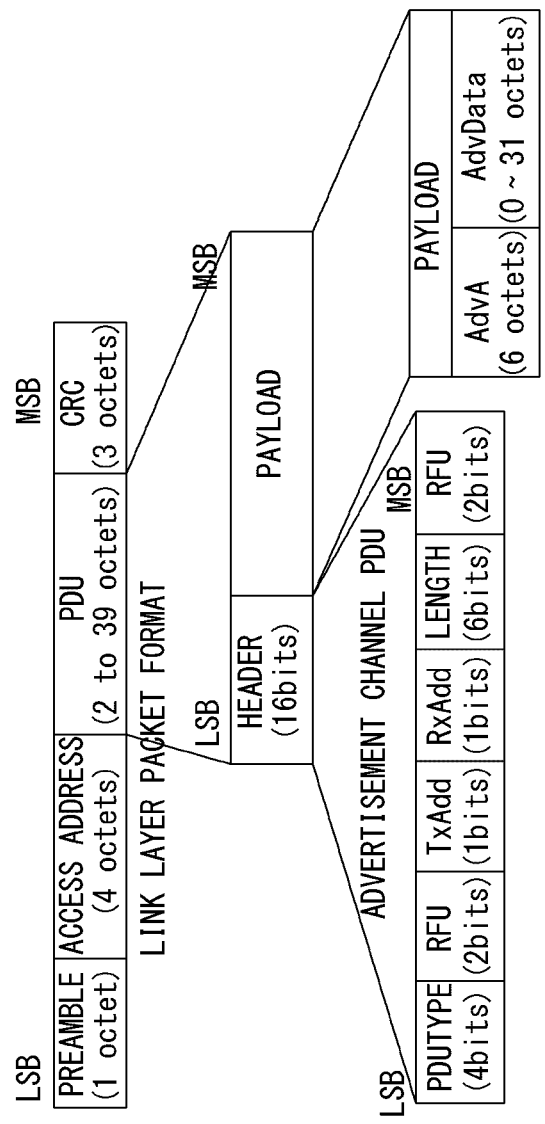
【Figure 8】

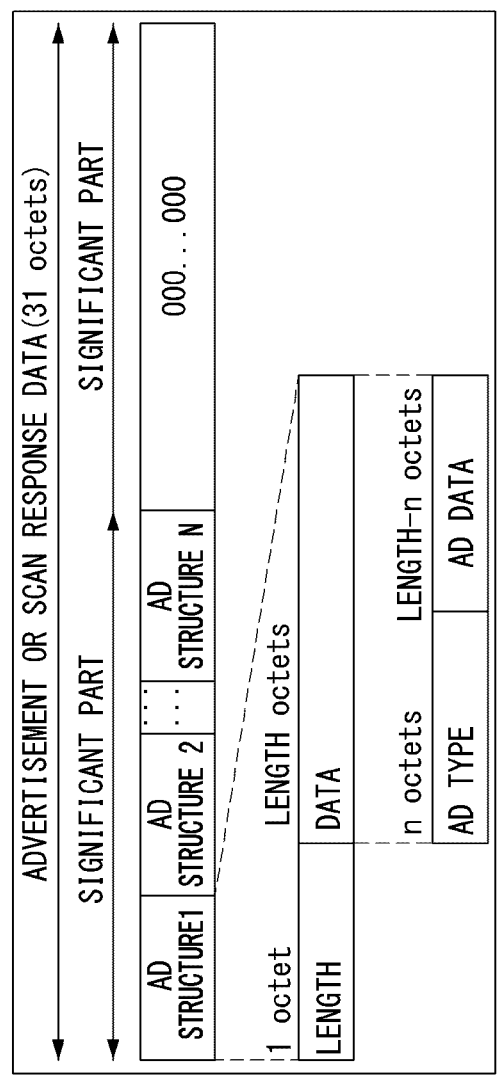
[Figure 9]

[Figure 10]
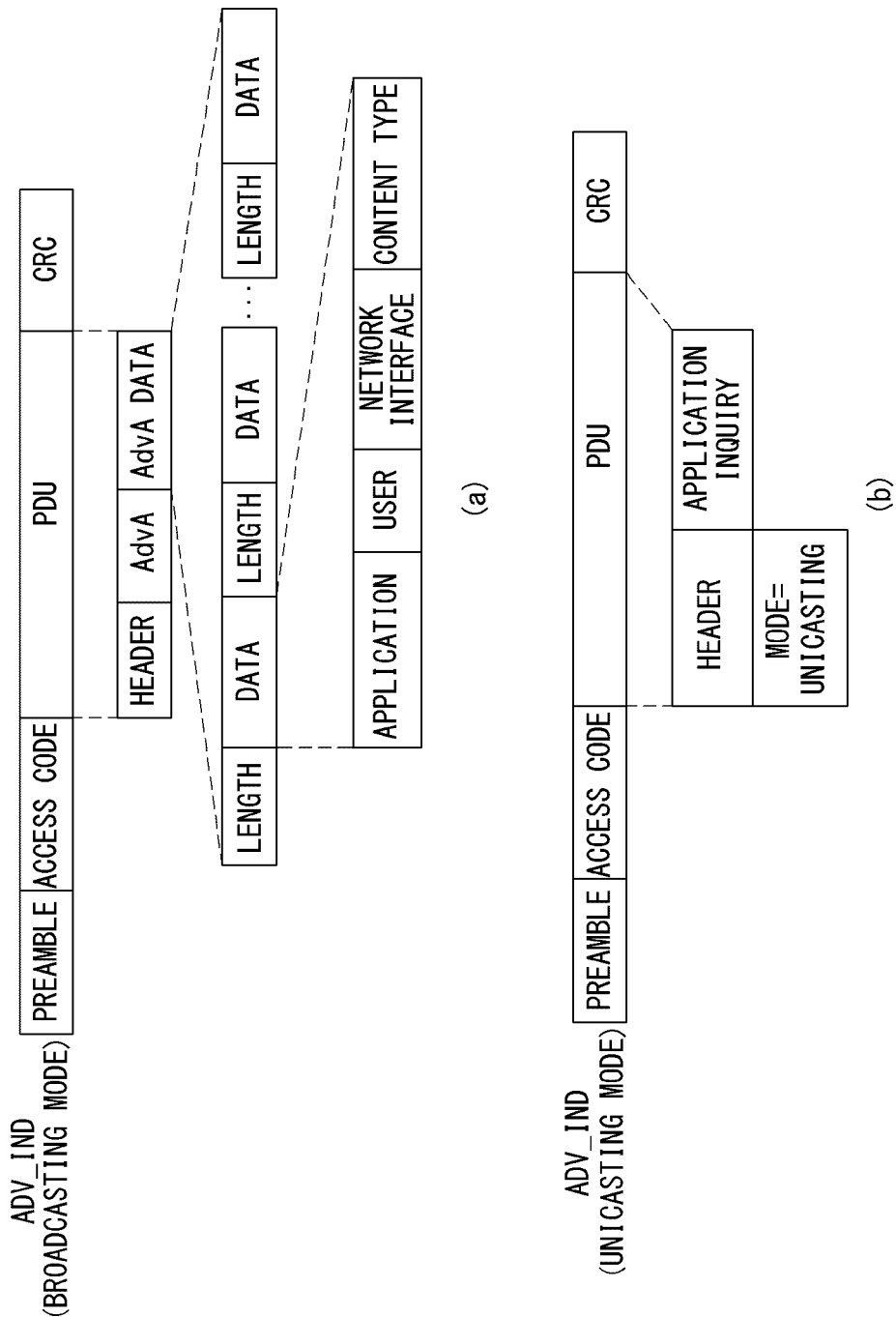

【Figure 11】
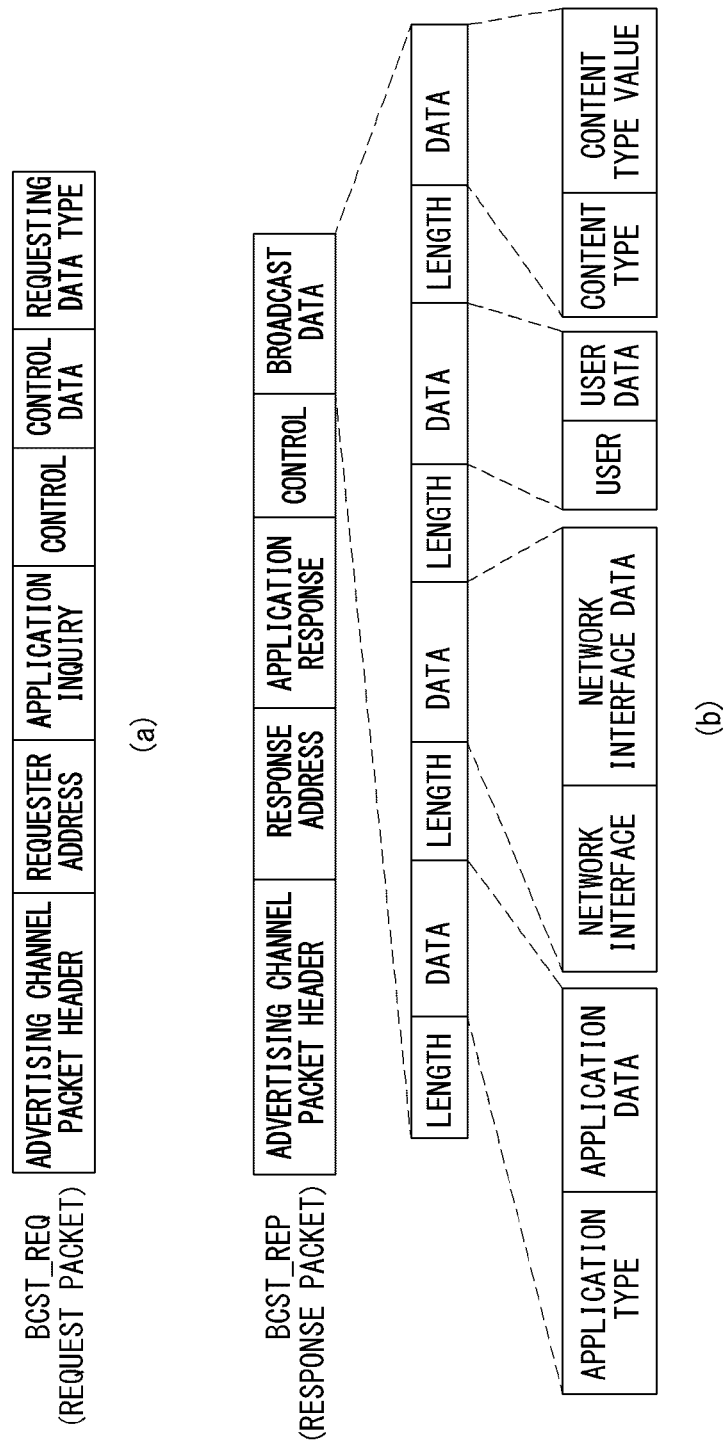

【Figure 12】
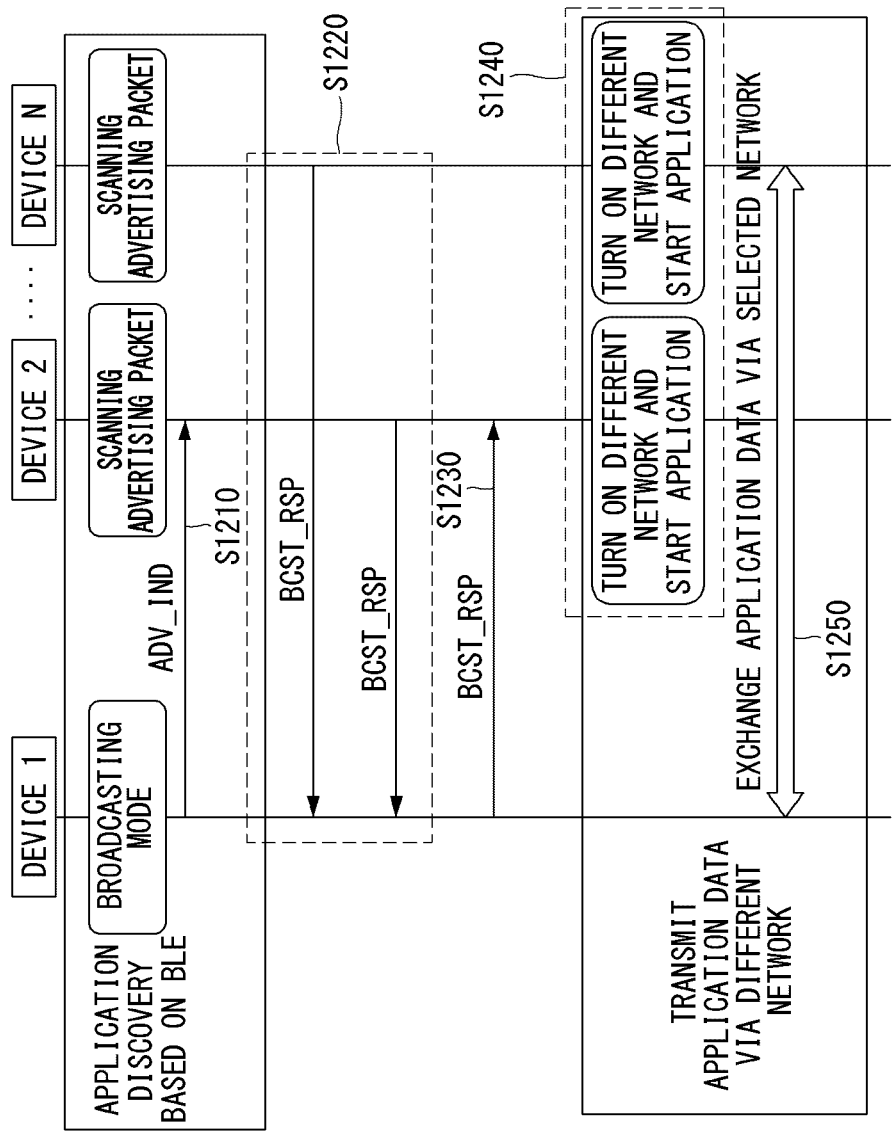

[Figure 13]
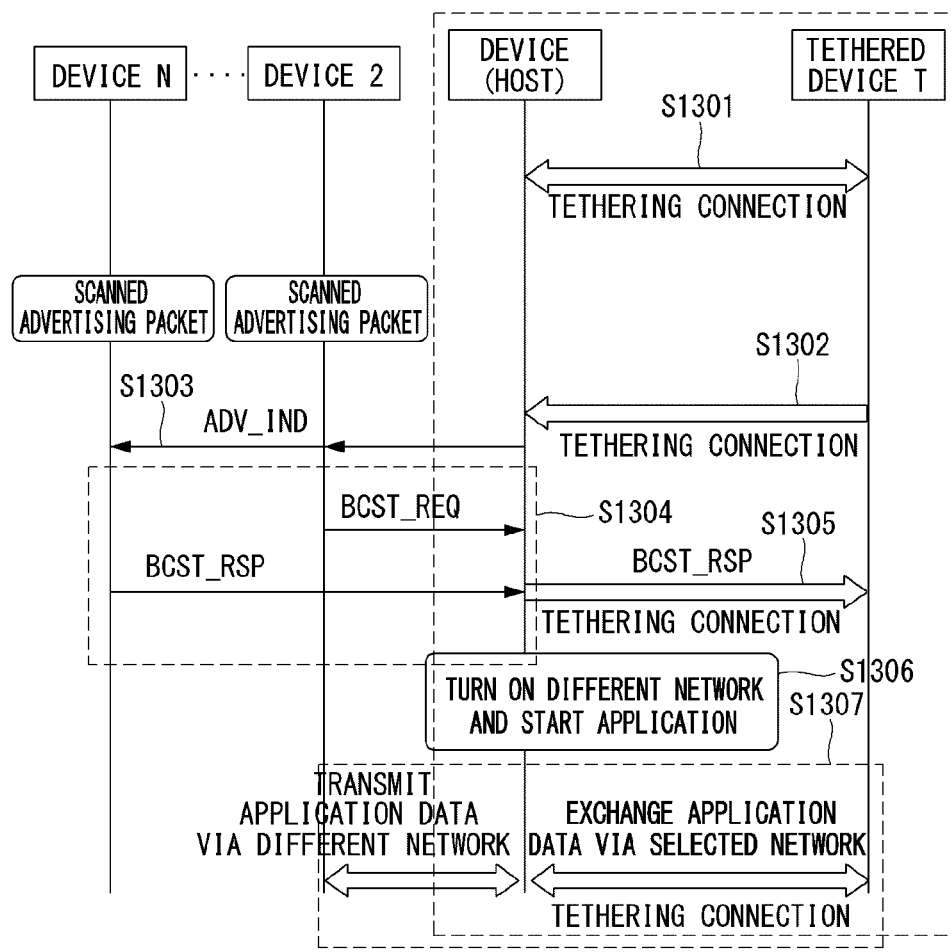

[Figure 14]
DEVICE 1
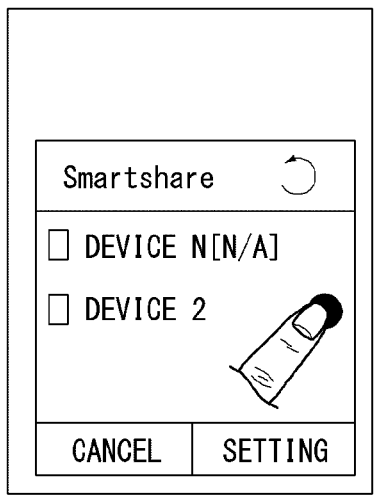
(a)
DEVICE 2
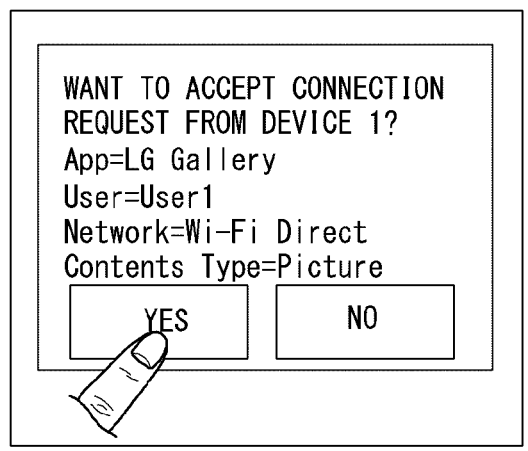
(b)

【Figure 15】
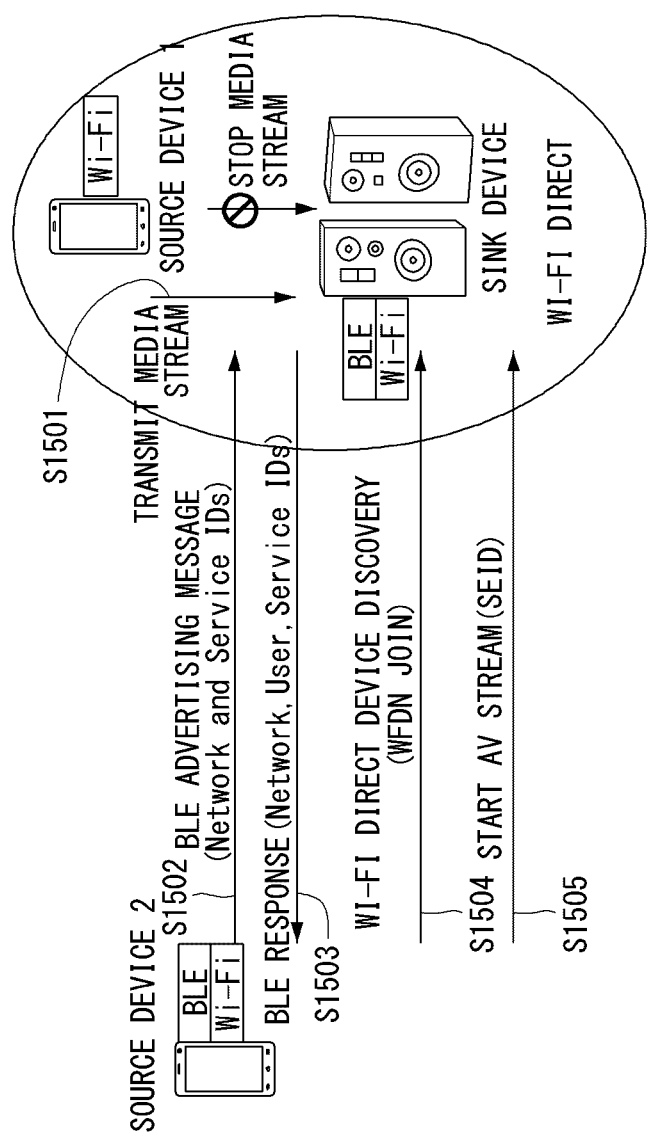

【Figure 16】
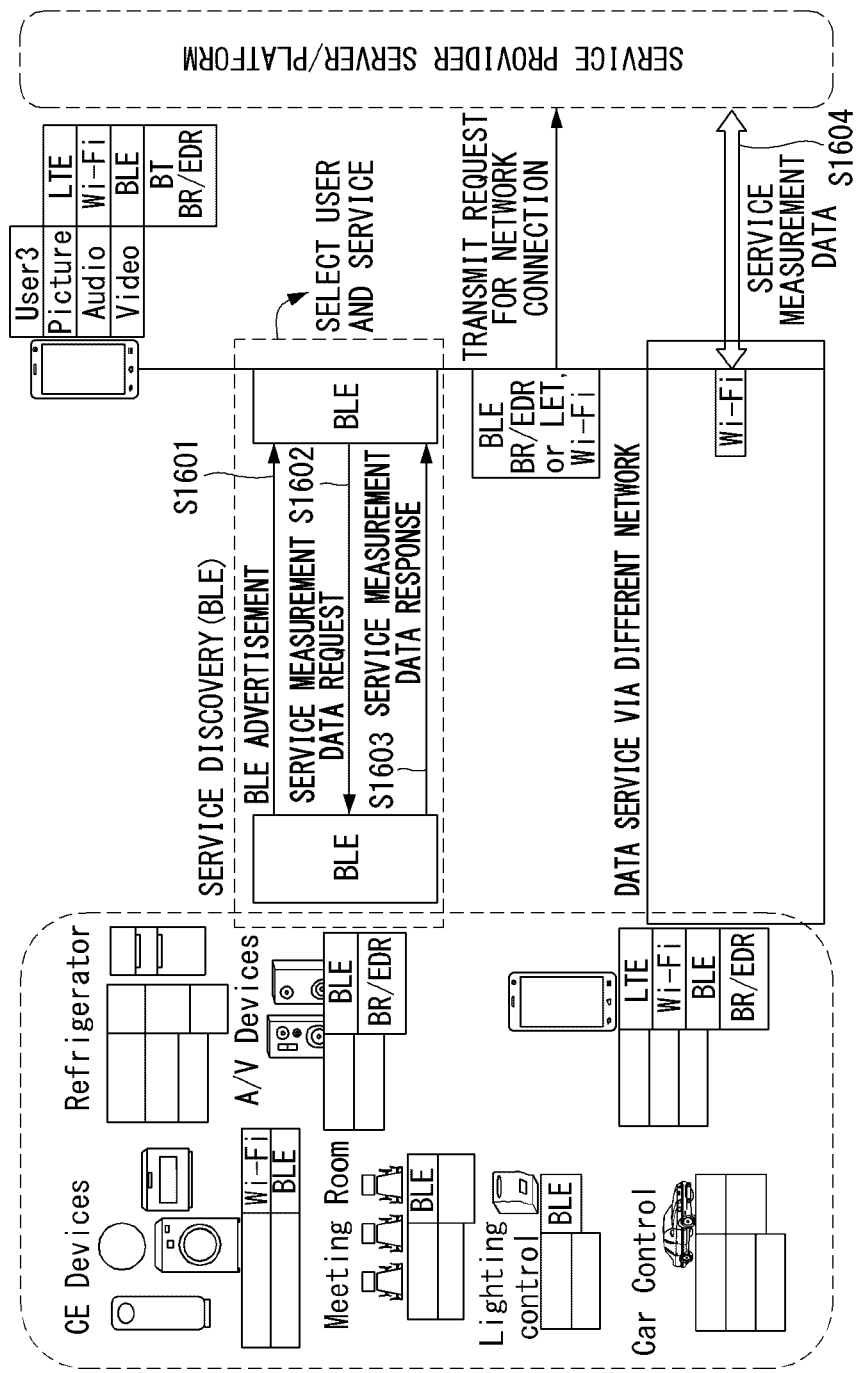

【Figure 17】
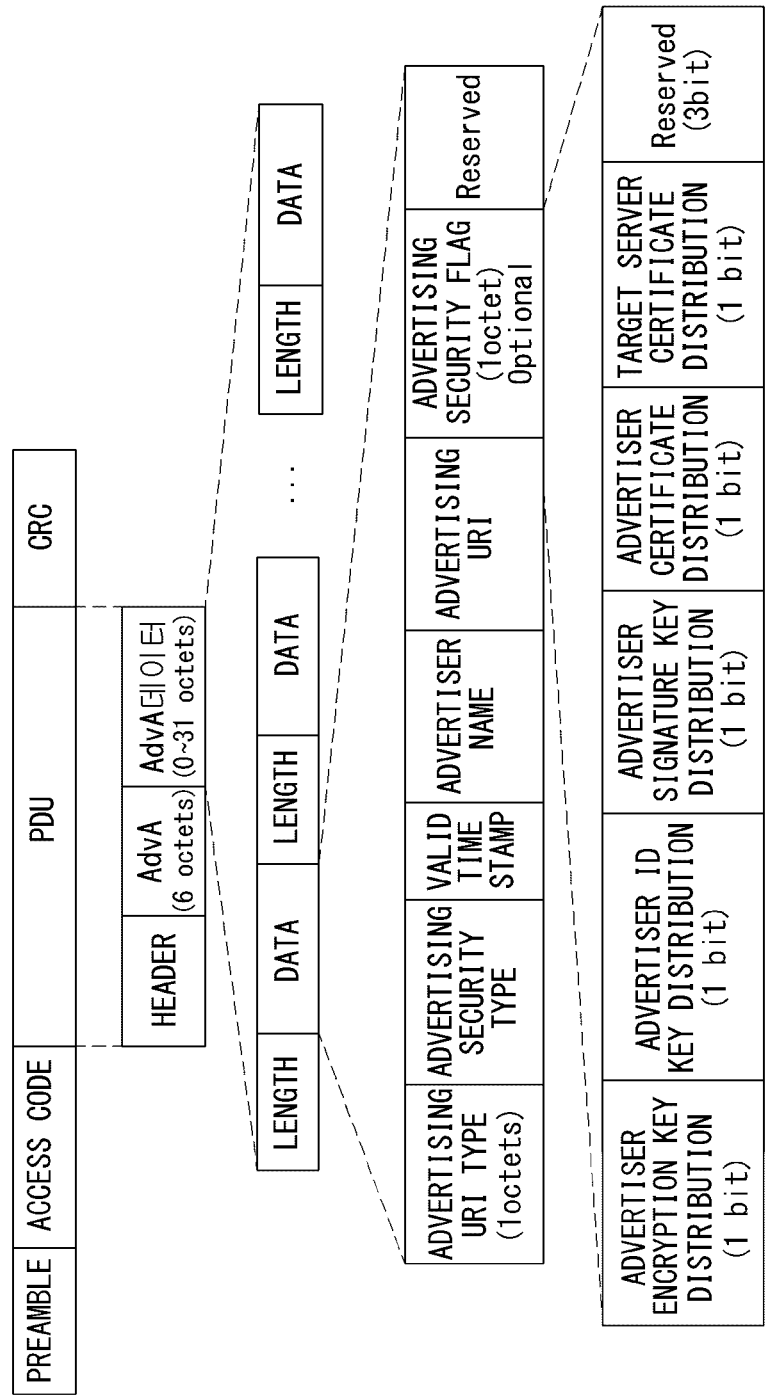

[Figure 18]
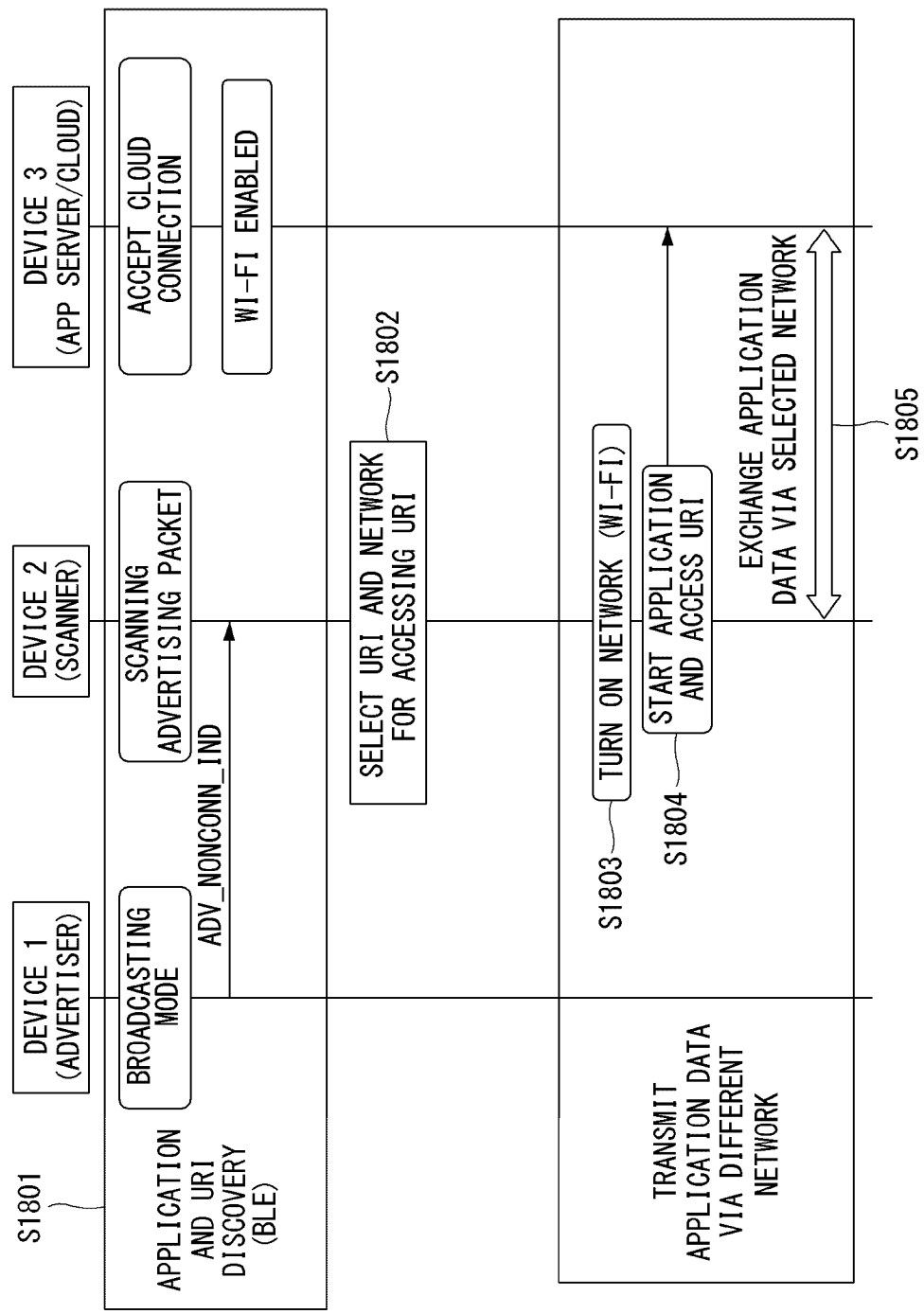

【Figure 19】
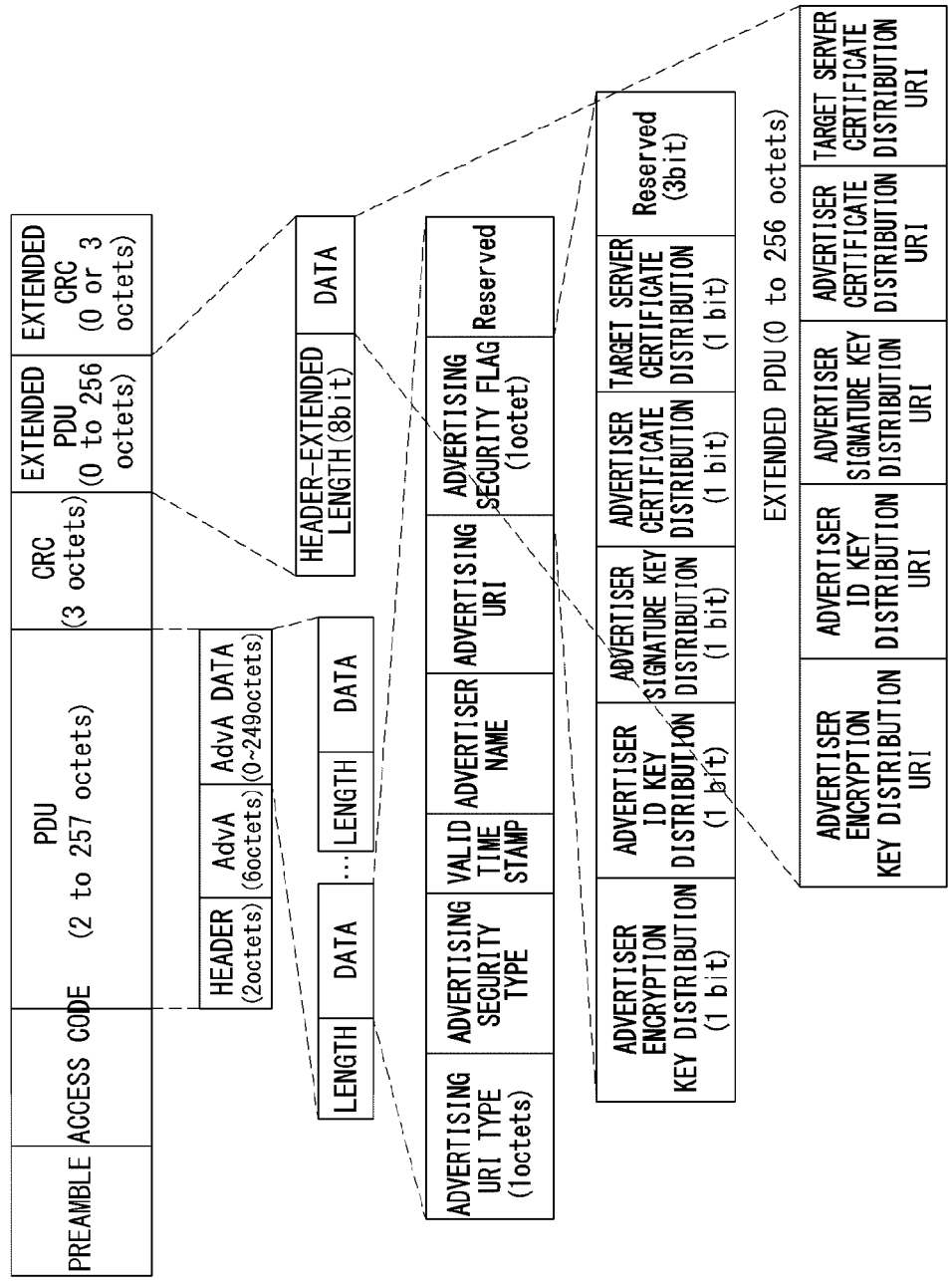

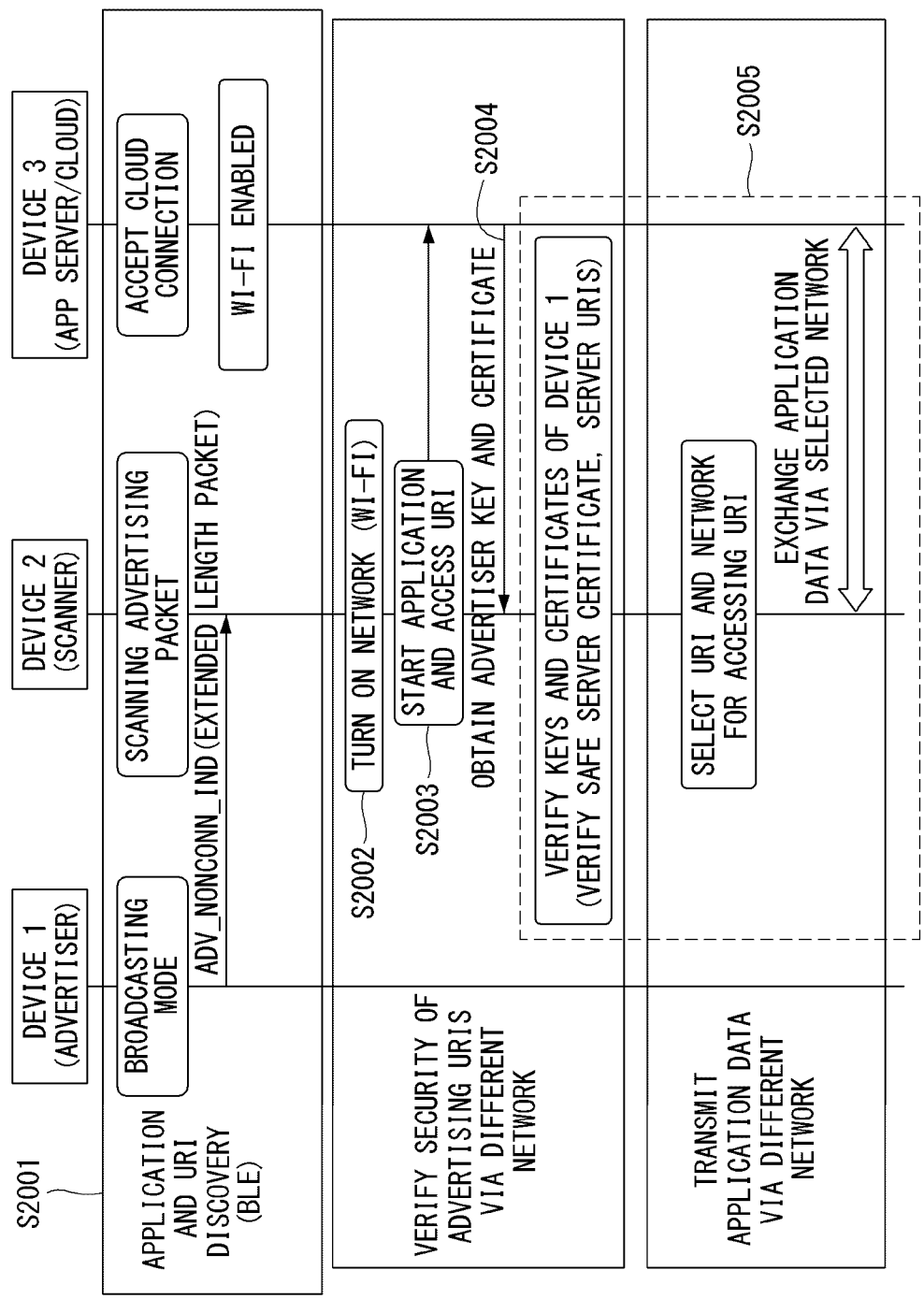
[Figure 20]

【Figure 21】
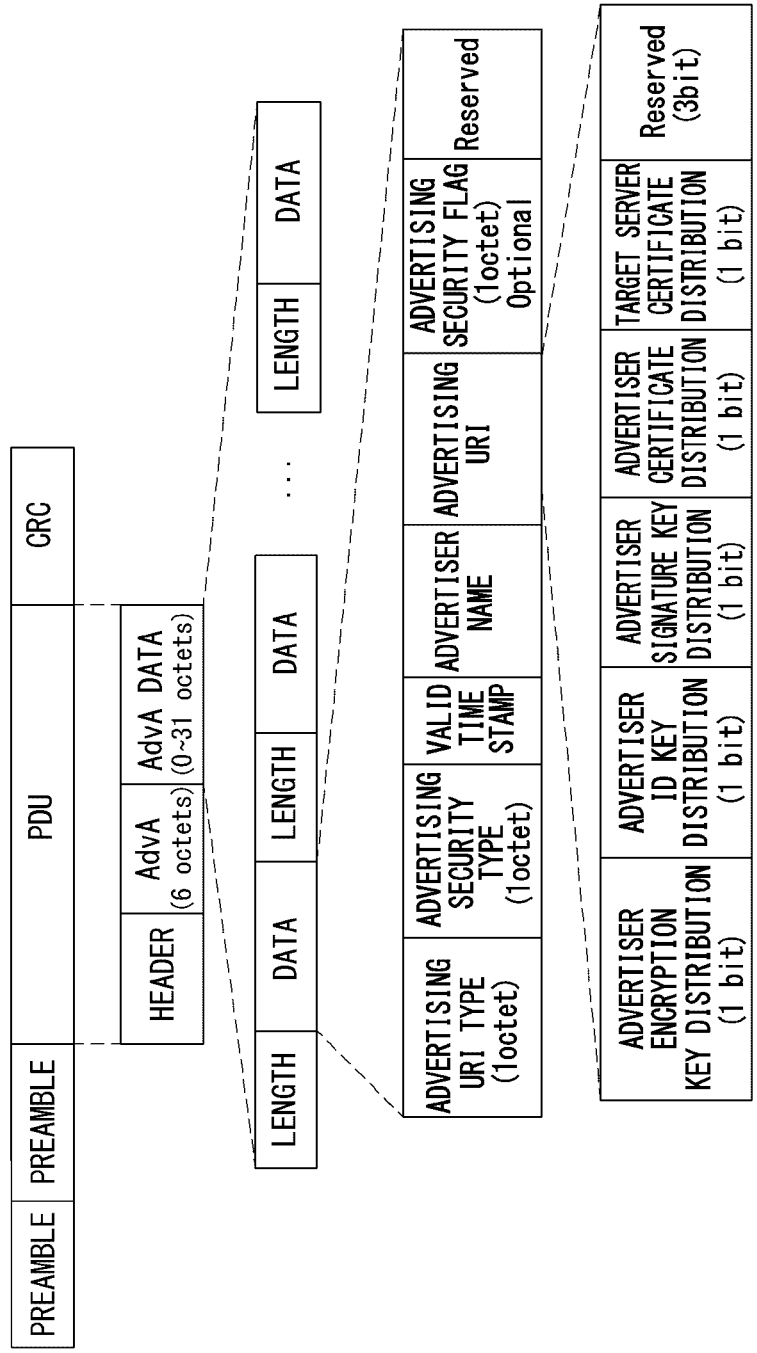

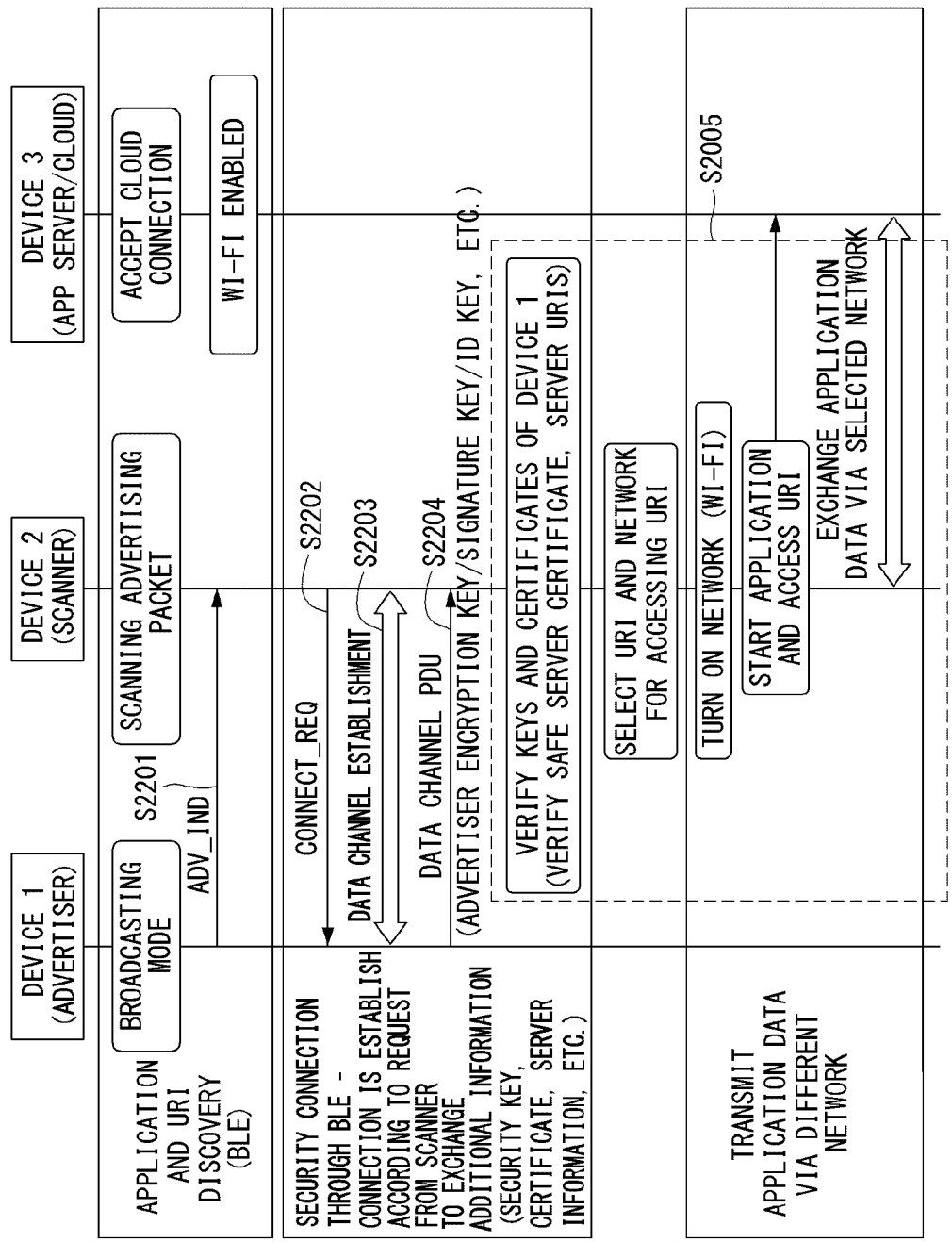
[Figure 22]

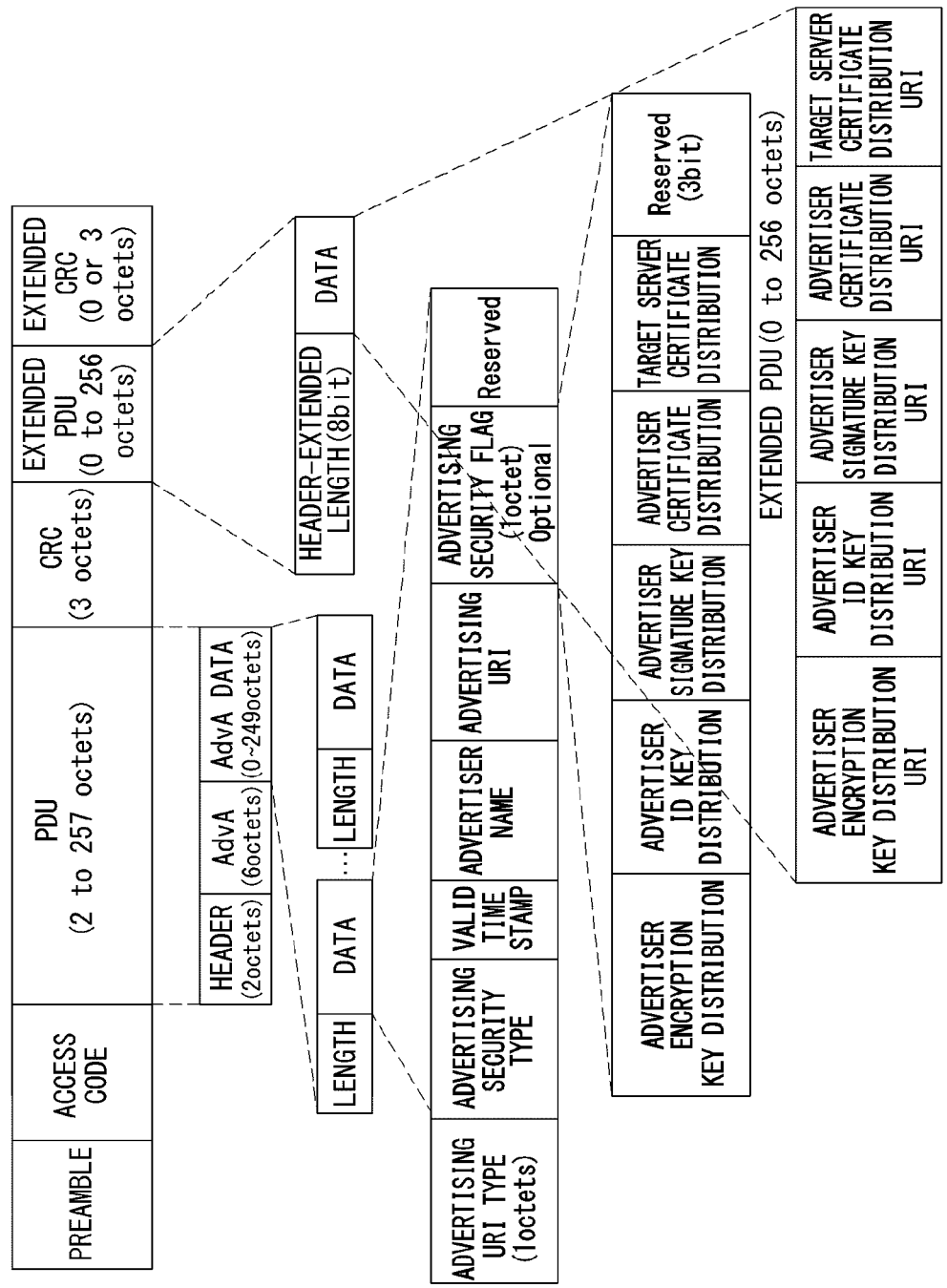
[Figure 23]

[Figure 24]
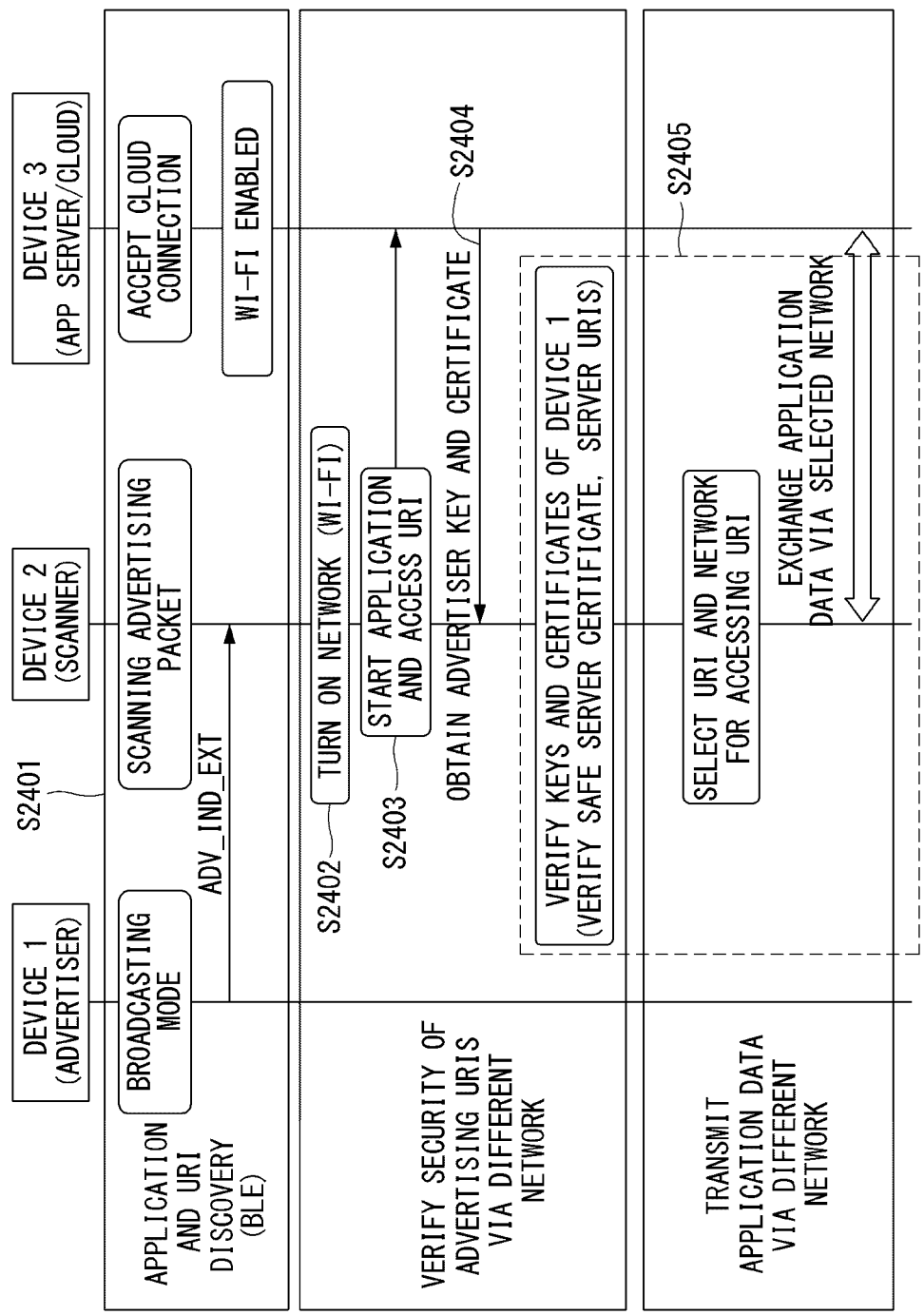

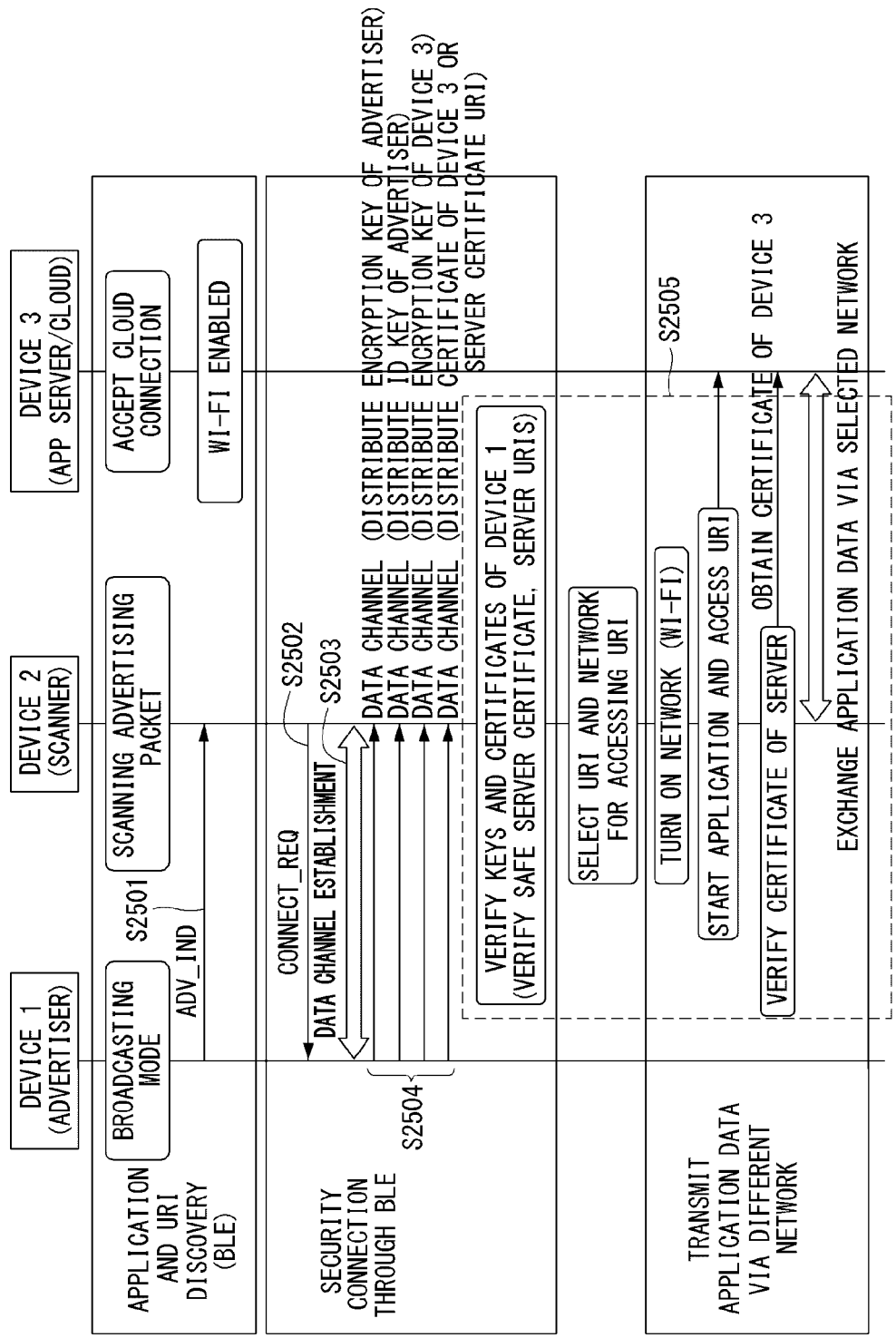
【Figure 25】

[Figure 26]
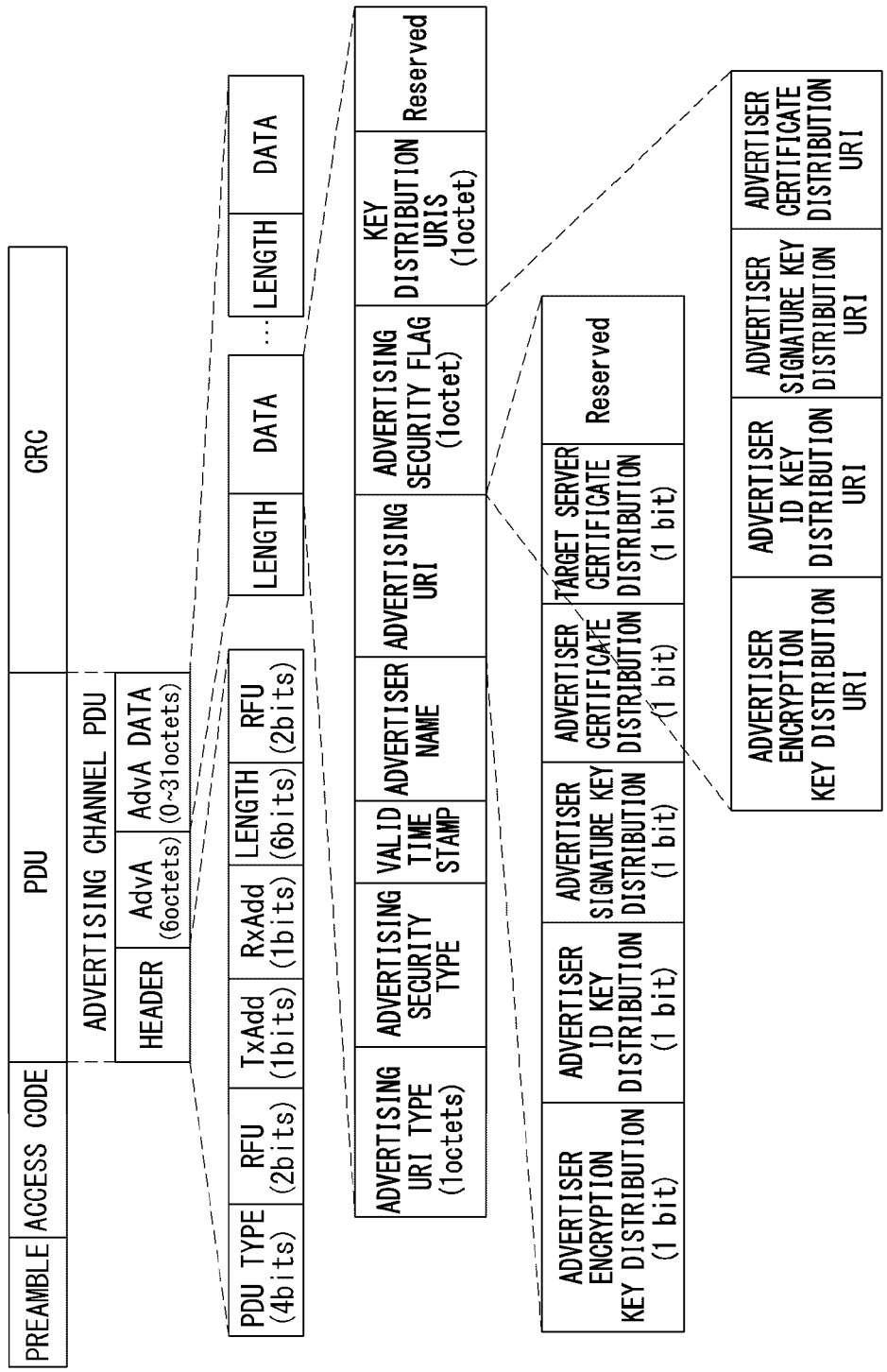

[Figure 27a]
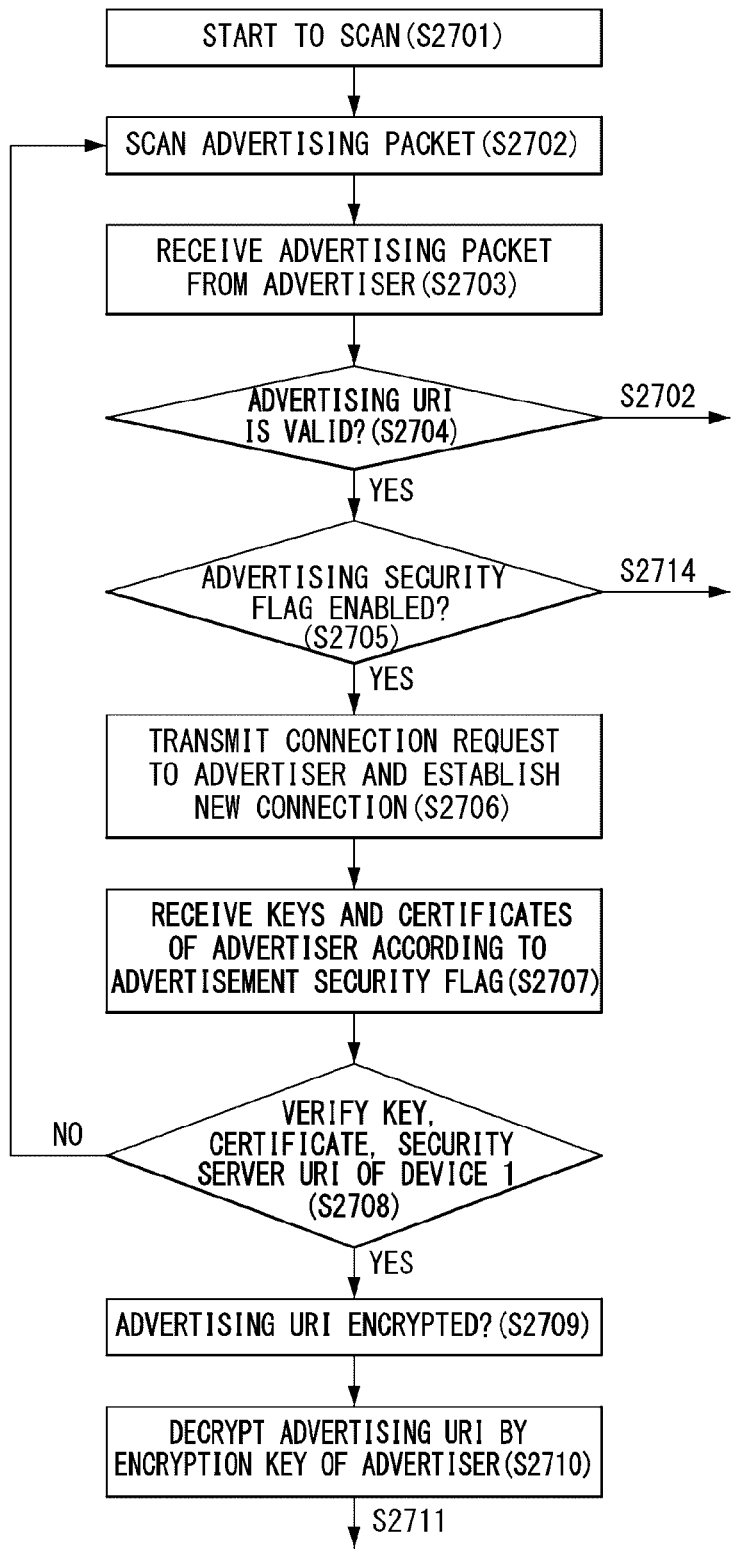

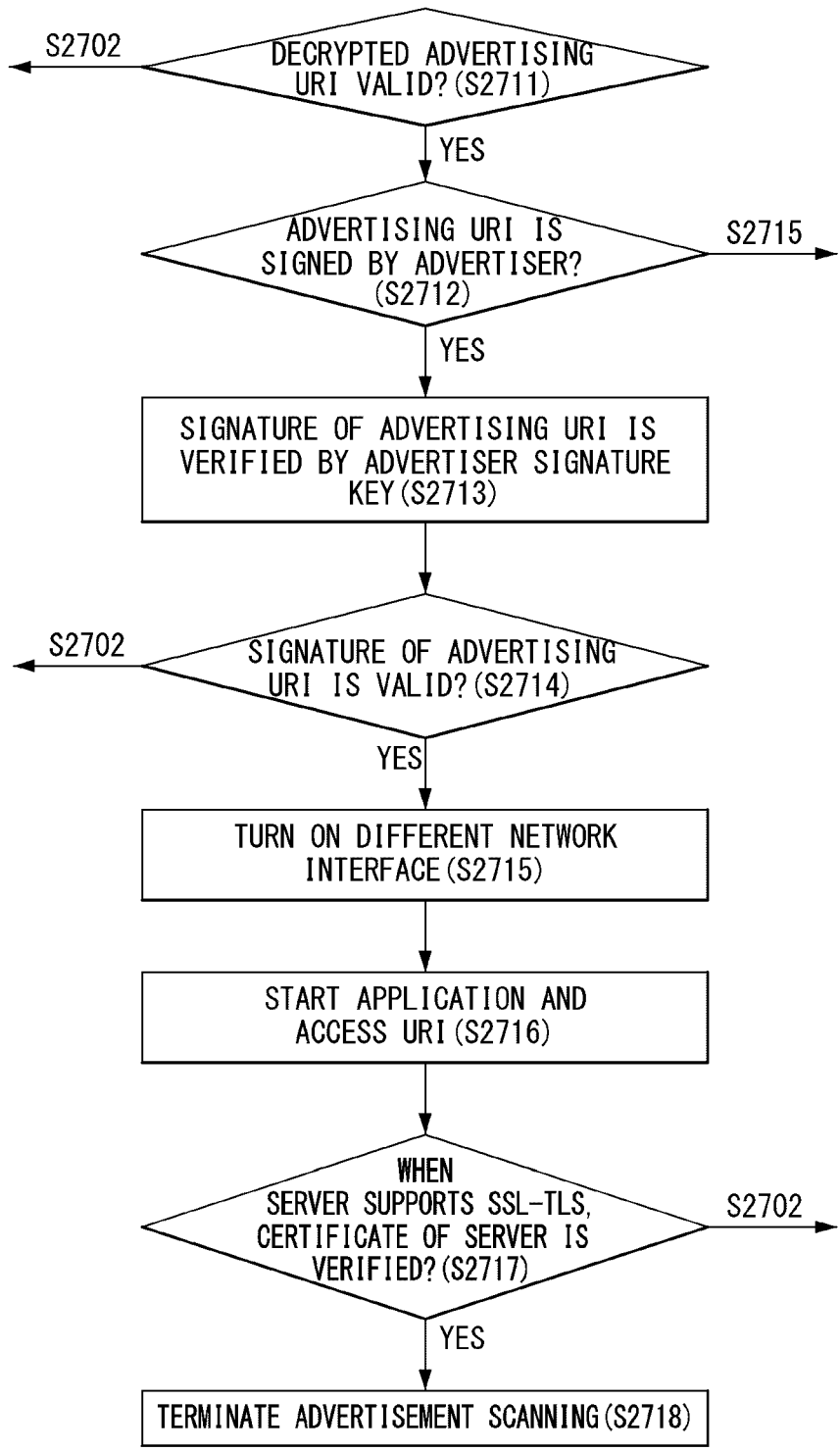
[Figure 27b]

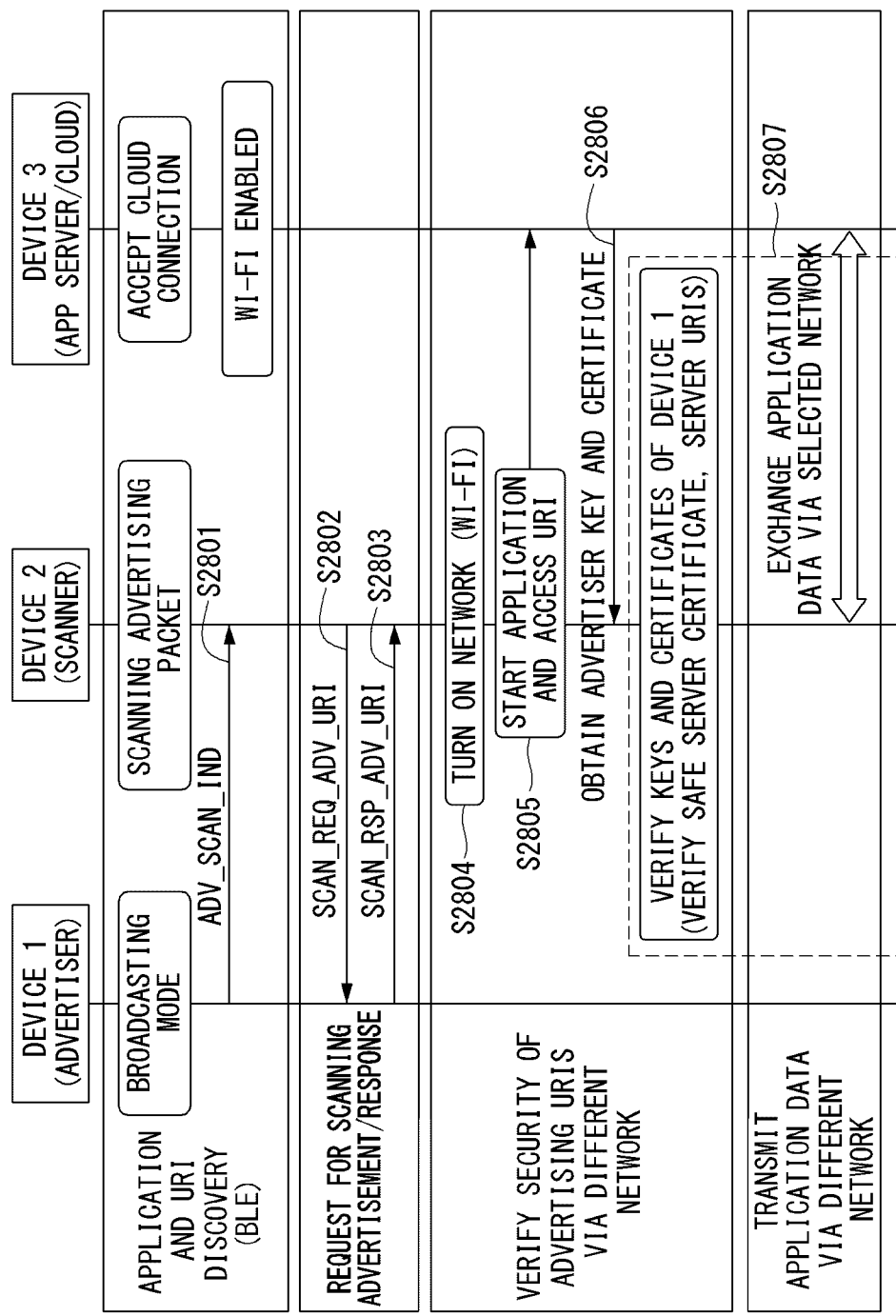
【Figure 28】

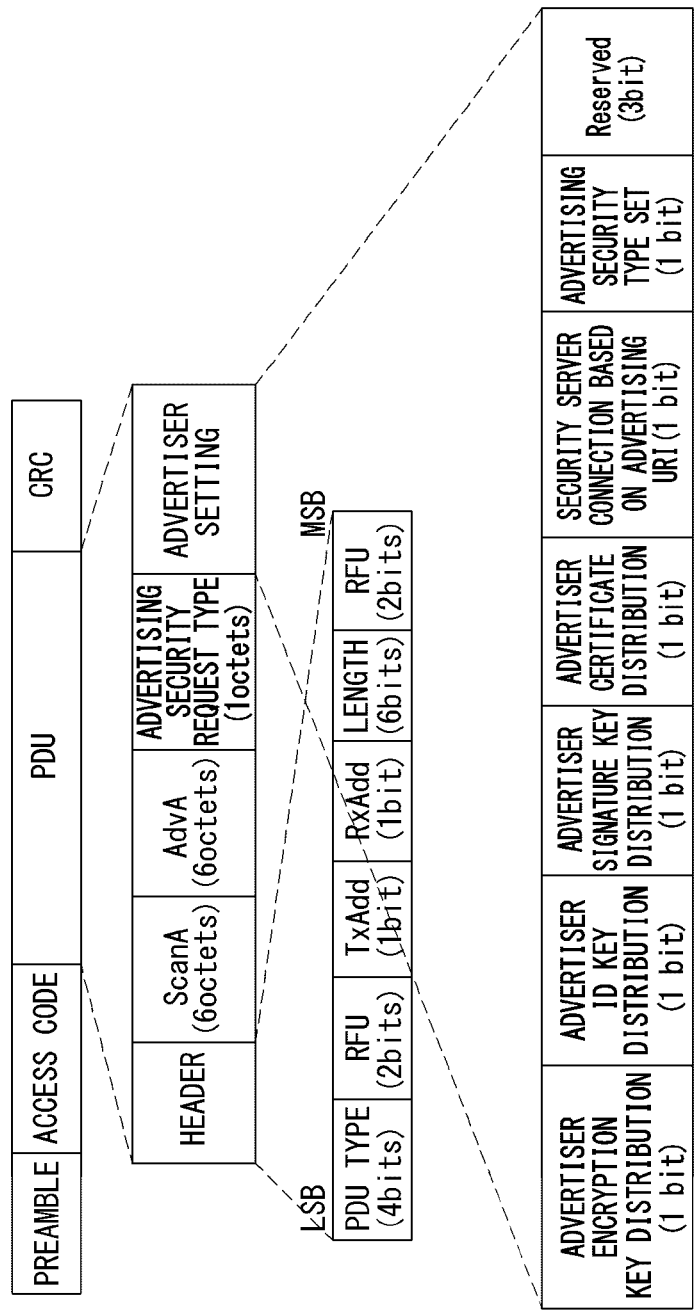
【Figure 29】

【Figure 30】
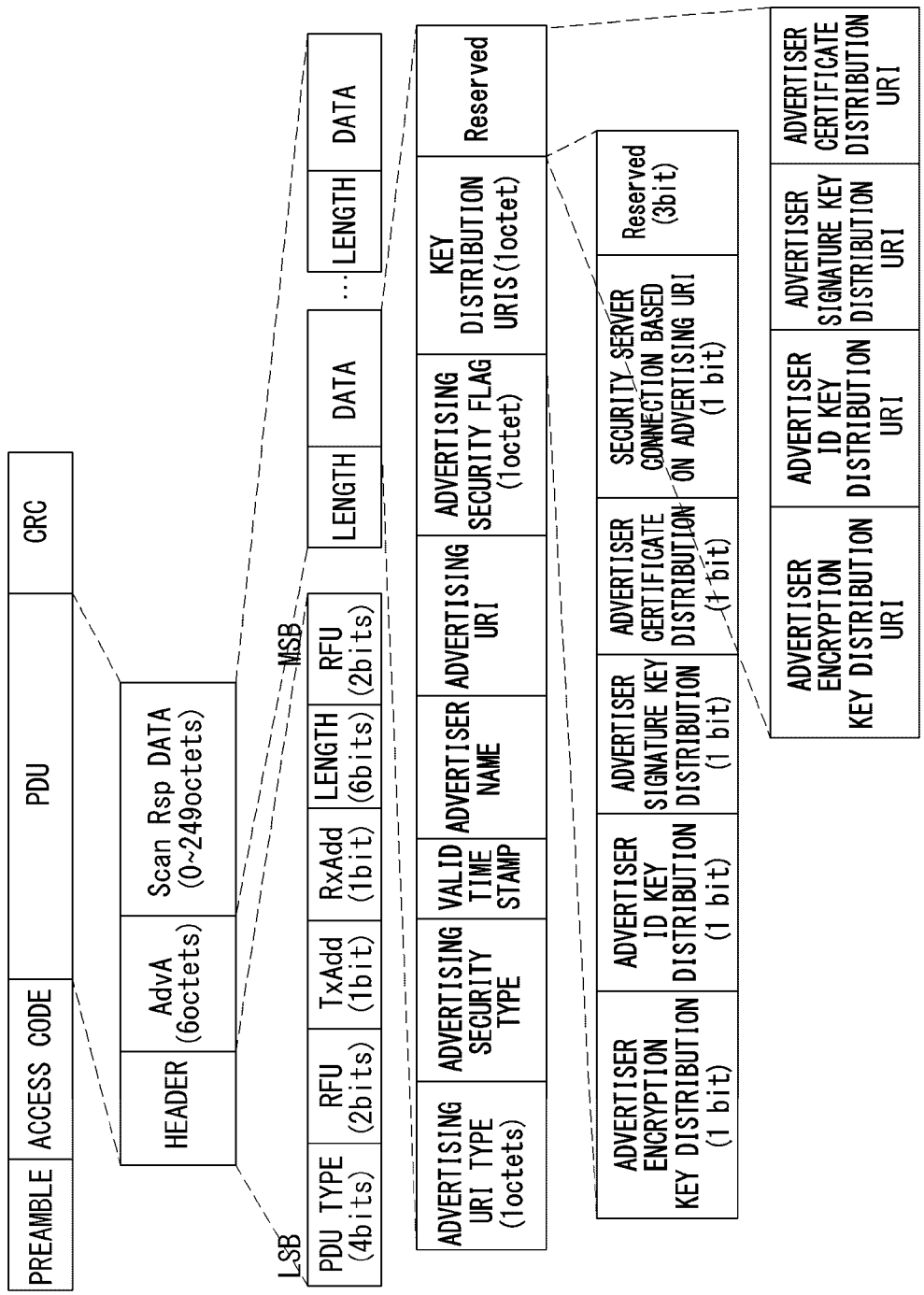

METHOD FOR TRANSMITTING AND RECEIVING DATA IN WIRELESS COMMUNICATION SYSTEM AND APPARATUS FOR PERFORMING THE SAME

CROSS REFERENCE TO RELATED APPLICATIONS

This application is the National Phase of PCT International Application No. PCT/KR2014/010417, filed on Nov. 3, 2014, which claims priority under 35 U.S.C. 119(e) to U.S. Provisional Application No. 61/900,948, filed on Nov. 6, 2013 and 61/992,875 filed on May 13, 2014, all of which are hereby expressly incorporated by reference into the present application.

TECHNICAL FIELD

The present invention relates to a method for transmitting and receiving data in a wireless communication system and an apparatus for performing the same.

BACKGROUND ART

Recently, Bluetooth has been commonly used. Bluetooth allows for transmission through a solid or a nonmetal material. Transmission coverage thereof generally ranges from 10 cm to 10 m and may be extended up to 100 m when transmission power is increased. Based on low cost and a wireless link of a short range, Bluetooth facilitates ad-hoc access in a fixed and mobile communication environment.

Bluetooth uses a frequency of 2.45 GHz, the same ISM band as that of WLAN standard 802.11b/g, and Bluetooth devices may perform wireless communication through a process such as searching/selecting/authenticating (pairing) regarding an adjacent Bluetooth device.

Also, Bluetooth enables a relatively high speed with low power consumption at low cost. However, since a transmission distance is limited to up to 100 m, Bluetooth is appropriate to be used in a restricted space.

As smartphones have been widely spread, multimedia content, screens, and non-content have been increasingly shared between devices using wireless communication technologies.

In the related art, in order to provide a service for sharing information between or among a plurality of devices without network connection information, devices are connected through several stages of searching, connection, secure information setting, and the like, by network interfaces supported by the devices.

Thus, performing a connection procedure between devices takes a great amount of time and consumes a great amount of power in a network to search for a device and a service.

In addition, even though devices are connected to each other, if a service desired to be shared between the connected devices is not supported, another device should be searched again from the beginning, unnecessarily wasting a great amount of time and resource of devices.

In addition, in the related art, since a device, which transmits an advertisement, unilaterally transmits a beacon including advertising data, or the like, to a reception device, the reception device cannot determine whether an advertising URI transmitted from the advertising device is a safe URI or a spam URI, lacking security.

DISCLOSURE

Technical Problem

Therefore, an object of the present invention is to provide a method for quickly searching for service information, user information, network information, and content information between devices by utilizing Bluetooth in a wireless communication system (for example, WPAN) and connecting devices, and sharing data via a different network.

Another object of the present invention is to provide a method for enabling devices to share a URI or URL indicating an advertisement, promotion, and status information and security information related thereto by utilizing Bluetooth in a wireless communication system, thus allowing for safely sharing a service.

Technical subjects of the present invention that may be obtained in the present invention are not limited to the foregoing technical subjects and any other technical subjects not mentioned herein may be easily understood by a person skilled in the art from the present disclosure and accompanying drawings.

Technical Solution

According to an aspect of the present invention, there is provided a method for transmitting and receiving data in a wireless communication system, performed by a first device, including: transmitting a first message including device connection information to at least one second device via a first network; receiving a response with respect to the first message from the at least one second device via the first network; transmitting a connection request message for requesting wireless connection of a second network to the at least one second device via the first network on the basis of the response, the connection request message including information regarding connection of a network indicating the second network; receiving a connection response message corresponding to a response with respect to the connection request message from the at least one second device via the first network; and transmitting and receiving data to and from a second device via the second network, wherein the device connection information includes at least one of network information indicating a network supported by the first device, service information indicating a service desired to be shared, content type information indicating a content type of the service desired to be shared, and user information indicating information related to a user.

The first network may be Bluetooth, and the second network may be a wireless network other than Bluetooth.

The first message may be an inquiry message of a Bluetooth basic rate (BR)/enhanced data rate (EDR), or an advertising channel packet data unit (PDU) of Bluetooth low energy (BLE).

The first device may transmit and receive a message to and from the at least one second device through tethering, and transmit and receive data to and from the second device.

The first message may further include at least one advertising uniform resource identifier (URI) or at least one of pieces of security information related to the at least one advertising URI.

The method may further include: receiving a second message requesting additional security information related to the at least one advertising URI from the at least one second device; and transmitting a third message including the requested additional security information to the at least one second device.

The second message may include an advertising security request type field.

The third message may include an advertising security flag field and an advertising security type field.

When a plurality of key distribution fields are included in the advertising security flag field, the third message by the number corresponding the number of the key distribution fields may be transmitted, and the third messages may include the key distribution fields, respectively.

The first message may be transmitted when a connectable and undirected advertising event occurs or when a non-connectable and undirected advertising event occurs.

When the first message is transmitted as the connectable and undirected advertising event occurs, the security information relates to the at least one advertising URI may be exchanged after connection with the second device is established.

The security information related to the at least one advertisement URI may include at least one of an advertising URI type field, an advertising security type field, a valid time stamp field, an advertiser name field, and an advertising security flag field.

The advertising security flag may include at least one of an advertiser encryption key distribution field, an advertiser ID key distribution field, an advertiser signature key distribution field, and a target server certificate distribution field.

The first message may further include an extended PDU and an extended CRC, and the extended PDU may further include at least one key distribution URI.

The first device may be an advertiser, and the second device may be a scanner.

According to an aspect of the present invention, there is provided a device, as a first device, in a method for transmitting and receiving data in a wireless communication system, including: a communication unit configured to transmit and receive a signal to and from the external wiredly and/or wirelessly; and a control unit functionally connected to the communication unit, wherein the control unit performs control to transmit a first message including device connection information to at least one second device via a first network, receive a response with respect to the first message from the at least one second device via the first network, transmit a connection request message for requesting wireless connection to a second network to the at least one second device via the first network on the basis of the response, receive a connection response message corresponding to a response with respect to the connection request message from the at least one second device via the first network, and transmit and receive data to and from a second network via the second network, wherein the device connection information includes at least one of network information indicating a network supported by the first device, service information indicating a service desired to be shared, content type information indicating a content type of the service desired to be shared, and user information indicating information related to a user, and wherein the connection request message includes information regarding connection of a network indicating the second network.

The control unit may receive a second message requesting additional security information related to the at least one advertising URI from the at least one second device, and transmit a third message including the requested additional security information to the at least one second device.

Advantageous Effects

According to an embodiment of the present invention, user information, service information, and network information are shared between devices using Bluetooth, whereby connection to a different network between devices may be quickly performed.

According to an embodiment of the present invention, a URI indicating advertisement, promotion, and status information and security information related thereto are shared between devices by utilizing Bluetooth whereby a service may be safely shared between devices.

According to an embodiment of the present invention, user convenience is provided in an environment in which a plurality of devices that want to play multimedia content, thus increasing user experience (UX).

Advantages and effects of the present invention that may be obtained in the present invention are not limited to the foregoing effects and any other technical effects not mentioned herein may be easily understood by a person skilled in the art from the present disclosure and accompanying drawings.

DESCRIPTION OF DRAWINGS

FIG. 1 is a view illustrating an example of a Bluetooth low power energy architecture, to which methods proposed in this disclosure is applicable.

FIG. 2 is a view illustrating an example of an internal block diagram of devices, to which the methods proposed in this disclosure is applicable.

FIG. 3 is a flow chart illustrating an example of a method for sharing content between devices.

FIG. 4 is a flow chart illustrating an example of a method for searching for a device and exchanging connection information using Bluetooth, proposed in this disclosure.

FIG. 5 is a flow chart illustrating another example of a method for searching for a device and exchanging connection information using Bluetooth, proposed in this disclosure.

FIG. 6 is a flow chart illustrating another example of a method for searching for a device and exchanging connection information using Bluetooth, proposed in this disclosure.

FIG. 7 is a view illustrating an example of a new extended inquiry response data format, proposed in this disclosure.

FIG. 8 is a view illustrating an example of an advertising message format, proposed in this disclosure.

FIG. 9 is a view illustrating an example of an advertisement or scan response data format, proposed in this disclosure.

FIG. 10 is a view illustrating an example of a packet structure including device connection information, proposed in this disclosure.

FIG. 11 is a view illustrating another example of a packet structure including device connection information, proposed in this disclosure.

FIG. 12 is a flow chart illustrating an example of a method for exchanging device connection information using a packet structure of FIG. 11.

FIG. 13 is a flow chart illustrating an example of a method for searching for a device and exchanging connection information using tethering, proposed in this disclosure.

FIG. 14 is a view illustrating an example of a user interface output from devices, proposed in this disclosure.

FIG. 15 is a flow chart illustrating a method for exchanging Wi-Fi direct connection information using Bluetooth and transmitting and receiving data and performing handover on streaming between devices via Wi-Fi direct, proposed in this disclosure.

FIG. 16 is a flow chart illustrating an example of a method for strengthening advertising URI security using Bluetooth, proposed in this disclosure.

FIG. 17 is a view illustrating an example of an advertising message structure proposed in this disclosure.

FIG. 18 is a flow chart illustrating an example of a method for obtaining information of an advertising URI using an advertising message of FIG. 17.

FIG. 19 is a view illustrating another example of an advertising message structure proposed in this disclosure.

FIG. 20 is a flow chart illustrating an example of a method for obtaining advertising URI information through an advertising message structure of FIG. 19.

FIG. 21 is a view illustrating another example of an advertising message structure, proposed in this disclosure.

FIG. 22 is a flow chart illustrating an example of a method for obtaining advertising URI information through an advertising message structure of FIG. 21.

FIG. 23 is a view illustrating another example of an advertising message structure, proposed in this disclosure.

FIG. 24 is a flow chart illustrating an example of a method for obtaining advertising URI information through an advertising message structure of FIG. 23.

FIG. 25 is a flow chart illustrating another example of a method for obtaining advertising URI information, proposed in this disclosure.

FIG. 26 is a view illustrating another example of an advertising message structure, proposed in this disclosure.

FIG. 27 is a flow chart illustrating an example of a method for accessing an advertising URI by a scanner, proposed in this disclosure.

FIG. 28 is a flow chart illustrating an example of a method for transmitting an advertising URI according to a request from a scanner, proposed in this disclosure.

FIG. 29 is a view illustrating an example of a scan request message structure of FIG. 28.

FIG. 30 is a view illustrating an example of a scan response message structure of FIG. 28.

BEST MODES

Hereinafter, an exemplary embodiment of the present invention will be described in detail with reference to the drawings.

Suffixes "module" and "unit" of constituent elements to be used in the following description are provided to facilitate a description of this specification, and the "module" and "unit" may be used with mixed.

A device described in this specification is a device in which wireless communication is available and includes a mobile terminal including a smart phone, a tablet PC, a desktop computer, a notebook computer, and a television (TV) including a smart TV and an Internet Protocol Television (IPTV).

Further, exemplary embodiments of the present invention are described in detail hereinafter with reference to the attached drawings, but the present invention is not limited by the exemplary embodiments or is not limited thereto.

In terms used in this specification, recently widely using general terms are selected in consideration of a function in the present invention, but the terms may be changed according to an intention of a person of ordinary skill in the art, practice, or appearance of new technology.

Further, in a specific case, terms randomly selected by an applicant exist, and in this case, in a corresponding description portion of the invention, a meaning thereof will be described.

Therefore, terms used in this specification should be analyzed based on a substantial meaning of a term thereof and an entire content of this specification instead of a name of a simple term.

As shown in FIG. 1, the BLE structure includes a controller stack that may operate to process a wireless device interface in which timing is important and a host stack that may operate to process high level data.

The controller stack may be called a controller, but in order to avoid being confused with the processor which is an internal element of a device described earlier in FIG. 2, the name of the controller stack is preferred in what follows.

First, the controller stack can be implemented by using a communication module which can include a Bluetooth wireless device and a processor module which can include a processing device such as a microprocessor.

The host stack can be implemented as part of the OS operating on the processor module or as a package instance on the OS.

In some cases, the controller stack and the host stack can be operated or carried out on the same processing device within the processor module.

The host stack comprises Generic Access Profile (GAP) 410, GATT based Profiles 420, Generic Attribute Profile (GATT) 430, Attribute Protocol (ATT) 440, Security Manager (SM) 450, and Logical Link Control and Adaptation Protocol (L2CAP) 460. The host stack is not limited to the aforementioned composition, but can include various protocols and profiles.

By using the L2CAP, the host stack multiplexes various protocols and profiles that Bluetooth specification provides.

First, the L2CAP 460 provides one bilateral channel for transmitting data to according to a specific protocol or with a specific profile.

The L2CAP is capable of multiplexing data among upper layer protocols, segmenting or reassembling packages, and managing multicast data transmission.

BLE uses three fixed channels: one for signaling, another for the security manager, and the third for the attribute protocol.

On the other hand, BR/EDR (Basic Rate/Enhanced Data Rate) uses a dynamic channel and supports protocol service multiplexer, retransmission, streaming mode.

The Security Manager (SM) 450 authenticates a device, which is a protocol for providing key distribution.

The Attribute Protocol (ATT) 440 relies on a server-client structure, which defines rules for the corresponding device to access data. Six message types are defined: Request, Response, Command, Notification, Indication, and Confirmation.

Request and Response message: Request message is used when a client device requests specific information from a server device, and Response message is used in response to the Request message, which is transmitted from the server device to the client device.

Command message: It is transmitted from the client device to the server device to indicate a command for specific operation, but the server device does not transmit a response to the Command message to the client device.

Notification message: The server device transmits this message to the client device to notify of an event, but the client device does not transmit a confirmation message with respect to the Notification message to the server.

Indication and Confirm message: the server device transmits this message to the client device to notify of an event. Different from the Notification message, the client device transmits a Confirm message with respect to the Indication message to the server device.

The Generic Access Profile (GAP) is the layer newly implemented to support BLE technology and is used to control selection of roles for communication among BLE devices and the procedure of multi-profile operation.

The GAP is used mainly for device discovery, connection establishment, and security; defines a method for providing information to a user; and defines the following attribute types.

Service: a combination of behaviors related to data. Defines basic operation of a device.
Include: defines a relationship between services.
Characteristics: a data value used by a service
Behavior: a format that can be readable by a computer, which is defined by Universal Unique Identifier (UUID) and a value type.

GATT-based profiles are dependent on the GATT and are applied mainly for BLE devices. The GATT-based profiles may include Battery, Time, FindMe, Proximity, Object Delivery Service, and so on. More specific descriptions of the GATT-based profiles are as follows.

Battery: method for exchanging battery information.
Time: method for exchanging time information.
FindMe: provides an alarm service according to a distance.
Proximity: method for exchanging battery information.

The GATT can be used as a protocol by which to describe how ATT is utilized at the time of composing services. For example, the GATT can be used to define how ATT profiles are grouped together with services and to describe characteristics associated with the services.

Therefore, GATT and ATT describe device states and services; and how features are associated with each other and how they are used.

The controller stack comprises a physical layer 490, link layer 480, and host controller interface 470.

The physical layer (wireless transmission and reception module 490) transmits and receives a radio signal of 2.4 GHz; and uses Gaussian Frequency Shift Keying (GFSK) modulation and frequency hopping utilizing 40 RF channels.

The link layer 480 transmits or receives Bluetooth packets.

Also, the link layer establishes a connection between devices after performing the advertising and scanning function by using three advertising channels; and provides a function of exchanging a maximum of 42 bytes of data packets through 37 data channels.

The Host Controller Interface (HCI) provides an interface between the host stack and the controller stack so that the host stack can provides commands and data to the controller stack and the controller stack can provide events and data to the host stack.

In what follows, the procedure of Bluetooth Low Energy (BLE) will be described briefly.

The BLE procedure comprises a device filtering procedure, advertising procedure, scanning procedure, discovering procedure, and connecting procedure.

Device Filtering Procedure

The device filtering procedure is intended to reduce the number of devices performing a response to a request, command, or notification in the controller stack.

It is not necessarily required for all of the devices to respond to a received request; therefore, the controller stack reduces the number of transmitted requests so that power consumption can be reduced in the BLE controller stack.

An advertising device or a scanning device can perform the device filtering procedure to restrict devices which receive advertisement packets, scan request, or connection request.

At this time, an advertising device refers to a device which transmits an advertisement event, namely a device which performs advertisement and is also called an advertiser.

A scanning device refers to a device which performs scanning, namely a device which transmits a scan request.

In the BLE specification, if a scanning device receives part of advertisement packets from an advertising device, the scanning device has to transmit a scan request to the advertising device.

However, in case transmission of a scan request is not required as the device filtering procedure is employed, the scanning device can ignore advertisement packets transmitted from an advertising device.

The device filtering procedure can be used even in the connection request procedure. If device filtering is used for the connection request procedure, the need for transmitting a response to a connection request can be made unnecessary by ignoring the connection request.

Advertising Procedure

An advertising device performs an advertisement procedure to perform non-directional broadcast by using the devices within the range of the advertising device.

At this time, non-directional broadcast refers to the broadcast in all directions rather than the broadcast in specific directions.

Different from the non-directional broadcast, directional broadcast refers to the broadcast in a specific direction. Non-directional broadcast is performed without involving a connection procedure between devices in a listening state (in what follows, they are called listening devices).

The advertising procedure is used to establish a Bluetooth connection to a nearby initiating device.

Or the advertising procedure can be used to provide periodic broadcast of user data to the scanning devices performing listening through an advertising channel.

In the advertising procedure, all of the advertisement (or advertisement events) are broadcast through an advertising physical channel.

Advertising devices can receive scan requests from listening devices performing the listening operation to obtain additional user data from advertising devices. An advertising device transmits a response with respect to the scan request to the device which has transmitted the scan request through the same advertising physical channel through which the advertising device has received the scan request.

While the broadcast user data sent as part of advertising packets form dynamic data, the scan response data are static for the most part.

An advertising device can receive a connection request from an initiating device on the advertising (broadcast) physical channel. If the advertising device has used a connectable advertisement event and the initiating device has not been filtered by the filtering procedure, the advertising device stops advertisement and enters a connected mode. The advertising device can resume advertisement after entering the connected mode.

Scanning Procedure

A device performing scan operation, namely a scanning device performs a scanning procedure to listen to non-directional broadcast of user data from advertising devices which use an advertising physical channel.

To request additional user data, the scanning device transmits a scan request to an advertising device through the advertising physical channel. The advertising device transmits a scan response with respect to the scan request through the advertising physical channel by including additional user data that the scanning device has requested.

The scanning procedure can be used while the scanning device is being connected to another BLE device in a BLE piconet.

If the scanning device receives a broadcast advertising event and stays in an initiator mode where a connection request can be initiated, the scanning device can initiate a Bluetooth connection to an advertising device by sending a connection request to the advertising device through the advertising physical channel.

If the scanning device transmits a connection request to the advertising device, the scanning device stops all the scanning for additional broadcast and enters the connected mode.

Discovering Procedure

Devices capable of Bluetooth communication (in what follows, they are called 'Bluetooth devices') perform the advertising procedure and the scanning procedure to discover devices in the surroundings of the devices or to be discovered by other devices within a given area.

The discovering procedure is performed in an asymmetric manner. A Bluetooth device searching for another Bluetooth device in the surroundings is called a discovering device and performs listening to search for devices advertising an advertisement event that can be scanned. A Bluetooth device that can be found and used by another device is called a discoverable device, and the discoverable device actively broadcasts an advertisement event so that other devices can scan the discoverable device through an advertising (broadcast) physical channel.

Both of the discovering device and the discoverable device may be already connected to other Bluetooth devices in a piconet.

Connecting Procedure

The connecting procedure is asymmetric. In the connecting procedure, while a particular Bluetooth device is performing the advertising procedure, other Bluetooth devices are required to perform the scanning procedure.

In other words, the advertising procedure can be a primary task to be performed, and as a result, only one device will respond to the advertisement. After receiving a connectable advertisement event from an advertising device, the connecting procedure can be initiated by sending a connection request to the advertising device through the advertising (broadcast) physical channel.

Next, operation states defined in the BLE technology, namely advertising state, scanning state, initiating state, and connection state will be described briefly.

Advertising State

The link layer (LL) enters the advertising state by the command of the host (stack). In case the link layer is in the advertising state, the link layer transmits advertising Packet Data Units (PDUs) from advertisement events.

Each advertisement event comprises at least one advertising PDU, and advertising PDUs are transmitted through advertising channel indices used. Each advertisement event can be closed earlier in case advertising PDUs are transmitted through the respective advertising channel indices, the advertising PDUs are terminated, or the advertising device needs to secure space to perform other functions.

Scanning State

The link layer enters the scanning state by the command of the host (stack). In the scanning state, the link layer listens to advertising channel indices.

The scanning state supports two types: passive and active scanning. The host determines scanning type.

No separate time or advertising channel index is defined to perform scanning.

While in the scanning state, the link layer listens to the advertising channel index for the duration of scanWindow. A scanInterval is defined as an interval between start points of two consecutive scan windows.

When there is no scheduling collision, the link layer has to perform listening to complete all of the scanIntervals of scanWindows as commanded by the host. In each scanWindow, the link layer has to scan other advertising channel indices. The link layer uses all of the advertising channel indices available.

In the case of passive scanning, the link layer is unable to transmit any packet but only receives packets.

In the case of active scanning, the link layer performs listening to the advertising device to rely on the advertising PDU type by which additional information related to the advertising PDUs and advertising device can be requested.

Initiating State

The link layer enters the initiating state by the command of the host (stack).

While in the initiating state, the link layer performs listening to the advertising channel indices.

While in the initiating state, the link layer listens to the advertising channel index for the duration of scanWindow.

Connection State

The link layer enters the connection state when a device performing a connection request, namely the initiating device transmits the CONNECT_REQ PDU to an advertising device or the advertising device receives the CONNECT_REQ PDU from the initiating device.

Establishing a connection is taken into account after the link layer enters the connection state. However, there is no need to take into account establishing a connection at the time the link layer enters the connection state. The only difference between a newly created connection and a preexisting connection is a supervision timeout value for link layer connection.

When two devices are connected to each other, the two devices perform the respective roles different from each other.

The link layer performing the role of the master is called a master, while the link layer performing the role of the slave is called a slave. The master adjusts the timing of a connection event, where the connection event denotes the time at which the mast and the slave are synchronized with each other.

A master (central) is such a device that periodically scans a connectable advertising signal to establish a connection to other device (slave, peripheral) and requests an appropriate device to establish a connection.

Also, once connected to a slave device, the master device sets up timing and supervises periodic data exchange.

At this time, the timing can be a hopping rule applied to two device to exchange data each time through the same channel.

A slave (peripheral) is such a device that periodically transmits a connectable advertising signal to establish a connection with other device (master).

Therefore, if a master device which has received the connectable advertising signal sends a connection request, the slave device accepts the request and establishes a connection with the master device.

After the slave device establishes a connection with the master device, the slave device exchanges data periodically by hopping a channel according to the timing specified by the master device.

In what follows, the packet defined in the Bluetooth interface will be described briefly. BLE devices use the packets described below.

Packet Format

The link layer has only one packet format used for both of the advertising channel packet and data channel packet.

Each packet comprises four fields: a preamble, access address, PDU, and CRC.

When one packet is transmitted from the advertising physical channel, the PDU will function as an advertising channel PDU; when one packet is transmitted from the data physical channel, the PDU will function as a data channel PDU.

Advertising Channel PDU

The advertising channel PDU comprises a 16 bit header and a payload of various size.

The PDU type filed of the advertising channel included in the header supports PDU types as defined in Table 1 below.

TABLE 1

| PDU Type | PACKet Name |
|---|---|
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: connectable non-directional advertisement event

ADV_DIREC_IND: connectable directional advertisement event

ADV_NONCONN_IND: non-connectable non-directional advertisement event

ADV_SCAN_IND: non-directional advertisement event that can be scanned

The PDUs are transmitted from the link layer in the advertising state and are received by the link layer in the scanning state or initiating state.

Scanning PDUs

The advertising channel PDU type below is called a scanning PDU and is used in such a state described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU comprises a 16 bit header and a payload of various size; and can include a Message Integrity Check (MIC) field.

The procedures, states, and packet formats of the BLE technology descried above can be applied to perform the methods according to the present invention.

Device Internal Block Diagram

FIG. 2 is a view illustrating an example of an internal block diagram of devices, to which methods proposed in this disclosure is applicable.

A connection initiating device 100 refers to a device that transmits a request message of issuing a command to a connection target device 200 or receives a request message requested by the connection target device and processes the received request message.

After transmitting a request message to the connection target device 200, the connection initiating device 100 processes a response message transmitted from the connection target device and provides a UI to a user.

Also, the connection initiating device 100 receives a request message requested by the connection target device, processes the received request message, and provides a UI to the user.

The connection target device 200 refers to a device that transmits a request message issuing a command to a connection initiating device or receives a request message requested by the connection initiating device and processes the received request message.

The connection target device 200 may be termed a remote device or an initiated device.

Also, the connection target device 200 transmits a request message to the connection initiating device, receives a response message transmitted from the connection initiating device, processes the received response message, and provides a UI to the user.

The connection initiating device 100 and the connection target device 200 may be a personal computer, a PDA, a mobile phone, a remote controller, a TV, a headphone, or an AV device (car system, headphone, player/recorder, timer, tuner, monitor, etc.).

The connection initiating device 100 and the connection target device 200 may include output unit 110 and 210, user interface (UI) units 120 and 220, memories 130 and 230, power supply units 140 and 240, communication units 150 and 250, control units (processors 160 and 260), and data processing units 170 and 270, respectively.

The output units, the UI units, the memories, the power supply units, the communication units, and the control units are functionally connected to perform a method proposed in the present invention/

The elements illustrated in FIG. 2 are not essential and an electronic device having greater or fewer elements may also be implemented.

The output units 110 and 210, which serve to generate an output related to sense of sight, sense of hearing, and sense of touch, may include display modules 112 and 212 and audio output modules 114 and 214, respectively.

The display modules 112 and 212 display and output information processed in the device. For example, when the device is in a call mode, the display modules 112 and 212 display a user interface (UI) or a graphic user interface (GUI) related to a call. When the device is in a video call mode or an image capture mode, the display modules 112 and 212 display a captured or/and received image or a UI or GUI.

The display modules 112 and 212 may include at least one of a liquid crystal display (LCD), a thin film transistor liquid crystal display (TFT LCD), an organic light-emitting diode (OLED), a flexible display, and a three-dimensional (3D) display.

The audio output modules 114 and 214 may output audio data received from the communication units 150 and 250 or stored in the memories 130 and 230 in a call signal reception mode, a call mode, a record mode, a voice recognition mode, a broadcast reception mode, and the like. Also, the audio output modules 114 and 214 may output an audio signal related to a function performed in the device (e.g., a call signal reception sound, a message reception sound, etc.). The audio output modules 114 and 214 may include a receiver, a speaker, or a buzzer.

The microphone may receive a tone transmitted from a counterpart device, and the speaker may transmit a tone to the counterpart device.

Here, the tone refers to a signal which has been converted into a sound from binary data through a transition matrix as described hereinafter.

The user input units 120 and 220 may generate input data for the user to control an operation of a terminal. The user input units 120 and 220 can include a keypad, a dome switch, a touchpad (static pressure or static capacitance), a jog wheel, and a jog switch.

The memories 130 and 230 may store a program for operating the control units 160 and 260 and temporarily store input/output data. The memories 130 and 230 may store data regarding various patterns of vibrations and sound output when a touch is applied to the touch screen.

The memories 130 and 230, mediums storing various types of information of a terminal, may be connected to the control units 160 and 260 and store a program for operating the control units 16 and 260, an application, a general file, and input/output data.

The memories 130 and 230 may include at least one type of storage medium including a flash memory type, a hard disk type, a multimedia card micro type, a card-type memory (e.g., SD or DX memory, etc), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The power supply units 140 and 240 refer to modules supplying power required for operations of the elements upon receiving external power or internal power under the control of the control units 160 and 260.

The communication units 160 and 260 may include one or more modules enabling wireless communication between a device and a wireless communication system or between a device and a network in which the device is positioned. For example, the communication units 160 and 260 may include a broadcast receiving module (not shown), a mobile communication module (not shown), a wireless Internet module (not shown), and a short range communication module (not shown).

The communication units 160 and 260 may be termed a transmission/reception unit.

The mobile communication module transmits and receives a wireless signal to and from at least one of a base station, an external terminal, and a server in a mobile communication network. The wireless signal may include a voice call signal, a video call signal, or various types of data according to text/multimedia message transmission/reception.

The wireless Internet module refers to a module for wireless Internet access. The wireless Internet module may be internally or externally coupled to the device. Technologies for wireless Internet may include WLAN (Wireless LAN) (Wi-Fi), Wireless broadband (Wibro), World Interoperability for Microwave Access (Wimax), or High Speed Downlink Packet Access (HSDPA).

Through the wireless Internet module, the device may be connected to another device in a Wi-Fi peer-to-peer (P2P) manner. Through the Wi-Fi P2P connection, inter-device streaming service may be provided, data may be transmitted/received, or the device may be connected to a printer to provide a printing service.

The short range communication module refers to a module for short range communication. As the short-range communication technology, Bluetooth, radio frequency identification (RFID), infrared data association (IrDA), ultra wideband (UWB), or ZigBee may be used.

The communication units 150 and 250 allows for transmission of a message such as a command, a request, an action, or a response, or a data transmission between initiating device and an initiated device.

The control units 160 and 260 refer to modules controlling a general operation of the connection initiating device and the connection target device, and may perform control to request transmission of a message via a Bluetooth interface and other communication interface and process a received message.

The control units 160 and 260 may be termed a controller, a micro controller, or a microprocessor, and may be implemented by hardware, firmware, software, or combinations thereof.

The controllers 160 and 260 may include an application-specific integrated circuit (ASIC), other chip-set, and logical circuit and/or a data processing unit.

FIG. 3 is a flow chart illustrating an example of a method for sharing content between devices.

In general, in a process of sharing content (or data) between devices, first, a network is searched, a network is accessed, and whether content for sharing is supported is determined.

According to a result of determining whether content is supported, content is shared between devices or the process is repeatedly performed until a device allowing for sharing content is searched.

In detail, referring to FIG. 3, a device 1 may activate or turn on a specific network (for example, network #1) through a reception input from a user (S301).

Here, the network may also be expressed as wireless communication, radio access technology (RAT), or a wireless (connection) function.

It is assumed that a plurality of remote devices (device 2 to device N) to which the device 1 may be connected, that is, which correspond to connection targets, currently activate or turn on every network interface or a wireless function.

The network interface or wireless function may be Bluetooth, Wi-Fi, ZigBee, 3G, 4G, and the like.

Thereafter, the device 1 performs network discovery via the activate network #1.

In detail, the device 1 transmits a message for network search to a plurality of remote devices (S302).

Thereafter, the device 1 receives responses regarding the message transmitted in step S302 from one or more remote devices (S303).

Thereafter, the device 1 performs a connection procedure to establish connection with one of remote devices which have transmitted the response in steep S303.

In detail, the device 1 transmits a connection request message for network connection to remote devices which have transmitted a response in step S303 (S304).

Thereafter, upon receiving the connection request message, the remote devices outputs a UI for selecting "connection acceptance" or "connection rejection" through an output unit in order to receive user confirmation regarding a network connection request (S305).

Thereafter, when a remote device receives confirmation of "connection acceptance" from the user, the remote device transmits a connection response message including a result regarding a network connection request to the device 1 (S306).

Accordingly, the device 1 establishes a network connection with any one remote device and subsequently determines whether an application desired to be shared is supported by the devices (the device 1 and the device connected to the device 1) (S307).

Here, in a case where the application is supported by the devices, the device 1 exchanges data related to the application with the connected remote device (S308).

Here, the data related to the application may be a file, a message, control information, audio/video (A/V) data, and the like.

However, when the application is not supported by the devices, the device 1 repeatedly performed steps S302 to S307 in order to search for a remote device for sharing the application.

As discussed above, in a case in which content sharing between devices is performed through the method of FIG. 3, several stages such as searching, connection, security setting, and the like, should be performed by network interfaces supported by devices, and thus, a great amount of time and power are required for connection between devices and sharing information.

That is, even though a network connection is established between devices, if the device or a corresponding network cannot support a specific service, the process of searching and connecting a different device should be performed again from the beginning.

Hereinafter, a method for quickly performing searching on a service, user information and content information between devices using Bluetooth in a wireless personal area network (WPAN) and sharing content between devices through network communication (Wi-Fi, ZigBee, 3G, 4G, 5G, NFC, RFID, etc.) other than Bluetooth communication, proposed in this disclosure will be described.

In Bluetooth communication, both Bluetooth basic rate/enhanced data rate (BR/EDR) technology and Bluetooth low energy technology may be applied.

FIG. 4 is a flow chart illustrating an example of a method for searching for a device and exchanging connection information using Bluetooth, proposed in this disclosure.

In a WPAN environment, a plurality of devices may be present, and the plurality of devices may be classified as a first device and a second device.

The first device may be a device requesting device connection to share content with other devices, and the second device may be a remote device corresponding to a connection request target.

As illustrated in FIG. 4, the first device performs a service discovery procedure using Bluetooth communication.

BLE technology or Bluetooth BR/EDR technology may be utilized in Bluetooth communication, and hereinafter, the BLE technology will be described as an example.

Referring to the service discovery process, the first device transmits a BLE advertising message including at least one of network (type) information, user information, content type information, or service information (S401).

The BLE advertising message may be transmitted in a broadcast or unicast manner.

The BLE advertising message may be expressed as an advertising channel packet data unit (PDU) or an advertising packet.

The network information is information indicating a network interface supported by a device, which may be Wi-Fi (for example, SSID or channel information), Wi-Fi Direct (Group ID), NFC, Bluetooth, Ethernet, and the like.

The user information may be information related to a user who uses the device, which may be a user ID, a user name, user preference, account information, and the like.

The service information refers to information indicating a service that can be used in a device or that is desired to be shared with other device, which may be a service ID, an application ID, or cloud service provider information.

The content type information indicates a content type of a service that can be used or that is desired to be shared. The content type may include video, picture, music, or a document.

Thereafter, upon receiving the BLE advertising message, the at least one second device transmits a response including network information, user information, and service information thereof to the first device (S402).

Thereafter, the first device selects a user (or a device) and a service for sharing on the basis of the response received from the at least one second device (S403).

The service may be a facebook, dropbox, Web services, picture, file sharing, message, and the like, and in FIG. 4, it is illustrated that the picture service is selected.

Thereafter, in order to perform wireless communication connection for sharing content, the first device transmits a network connection request message to the second device selected in step S403 (S404).

Here, wireless communication used for searching for a device and exchanging connection information and wireless communication used for data transmission/reception may be different.

Thereafter, the first device establishes a new network connection with the second device, and exchanges data with the second device via the connected network (or transmits and receives data to and from the second device) (S405).

FIG. 5 is a flow chart illustrating another example of a method for searching for a device and exchanging connection information using Bluetooth low energy (BLE).

Specifically, FIG. 5 illustrates a method for searching for a device and exchanging connection information using BLE.

First, the device 1 activates or turns on a BLE function through a user input (S501).

Here, it is assumed that the BLE function of the device 2 or device N is active and other wireless functions thereof are inactive.

Thereafter, the device 1 performs an application discovery procedure using the BLE technology.

The application discovery procedure may also be expressed as a service discovery procedure.

In detail, the device 1 transmits a BLE service search having an extended inquiry response (EIR) request to remote devices (S502).

That is, in order to receive an EIR from remote devices, the device 1 may transmit a BLE service search which may be expressed as an inquiry message.

Thereafter, the device 1 receives a response regarding the BLE service search from one or more remote devices (S503).

The response regarding the BLE service search includes EIR data, and the EIR data includes device connection information such as application information, user information, network information, and content type information of the remote device.

Thereafter, the device 1 selects an application on the basis of the response regarding the BLE service search, and performs a network interface connection process in order to form a group with a specific remote device (S504).

That is, the device 1 uses Bluetooth for a network interface used for device search and connection information exchange, and uses a network other than Bluetooth for a network interface used for sharing data.

In detail, in order to request connection via a different network interface on the basis of the information received in step S503, the device 1 transmits a connection request message to the remote devices (S505).

Thereafter, in order to receive a user confirmation regarding the request for connection of a different network interface, the remote devices outputs a UI allowing for connection acceptance or connection rejection (S506).

Here, when the remote device receives a user input regarding "connection acceptance", the remote device deactivates the activated BLE function and activates a different wireless function or a different network interface that can be used for sharing content (S507).

In FIG. 5, it is illustrated that the device 2 receives connection acceptance regarding the different network connection.

The device 2 transmits a connection response message as a response to the connection request message to the device 1 (S508).

Thereafter, the device 1 and the device 2 exchanges application data through the newly connected different network interface (S509).

FIG. 6 is a flow chart illustrating another example of a method for searching for a device and exchanging connection information using Bluetooth, proposed in this disclosure.

Specifically, FIG. 6 illustrates a method for searching for a device and exchanging connection information using Bluetooth basic rate/enhanced data rate (BR/EDR).

Referring to FIG. 6, the device 1 turns on Bluetooth communication to prepare to perform application discovery.

Bluetooth wireless functions of the device 2 to device N, remote devices, are active and other wireless functions thereof are inactive.

The device 1 receives selective input regarding an item desired to be transmitted from the user, and activates the Bluetooth wireless function (S601).

Thereafter, the device 1 performs an application discovery procedure using the Bluetooth BR/EDR with remote devices.

Referring to the application discovery procedure, in order to check the presence of remote devices to be connected nearby, the device 1 transmits an inquiry message (S602).

The device 1 includes application information selected by the user, user information, network interface information, and content type information in an inquiry message and broadcasts the inquiry message, or broadcasts these pieces of information through a separate message.

Here, the inquiry message or the separate message may further include an advertising URI Type, valid time stamp, advertiser Name, advertising security flag, and advertising URI Type information.

Details of the advertising URI type, valid time stamp, advertiser name, advertise security flag, advertising URI type information will be described with reference to FIG. 17 hereinafter.

Thereafter, the device 1 receives a response message including application information supported by remote devices, user information, network interface information, and content type information from the remote devices which have received the inquiry message (S603).

The application information, the user information, the different network interface information, the content type information, and the like, discussed in steps S602 and S603 may be included in EIR data and transmitted.

Thereafter, the device 1 determines whether there is a remote device which supports a plurality of applications nearby on the basis of the response message received in step S603 (S604).

Here, the device 1 may output device connection information, that is, the application information, the network interface information, and the like, received from the remote devices through an output unit.

Thus, the user of the device 1 may select an application and a network interface desired to be connected from the result output through the output unit of the device 1.

Thereafter, the device 1 performs a connection procedure with the remote devices in order to connect a different network interface to be used for sharing content.

In detail, the device 1 transmits a connection request message including user confirmation triggering information to the remote devices checked in step S603 (S605).

The connection request message may include user information, network information, and service confirmation information selected by the device 1.

Also, the connection request message may further include connection information required when a remote device is connected via an alternative carrier.

Thereafter, upon receiving the connection request message, the remote devices outputs a UI allowing for selecting as to whether to accept or reject a connection regarding a different network interface through user confirmation triggering information to the output unit (S606).

Thereafter, the remote devices activates a wireless connection function to be used for sharing content according to reception of a user input regarding connection acceptance or connection rejection. Here, the Bluetooth wireless function activated for searching for a device and exchanging connection information may be maintained in the active state, but preferably, the Bluetooth wireless function is deactivated in terms of power consumption.

In FIG. 6, it is illustrated that the device 2 receives an input regarding "connection acceptance" from the user and subsequently activates a wireless connection function selected by the device 1 (S607).

Here, it is illustrated that, since the device N receives an input regarding "connection rejection" from the user, the wireless connection function thereof selected by the device 1 is not activated.

Thereafter, the device 2 transmits a connection response message as a response with respect to the connection request message to the device 1 (S608).

The connection response message may include information related to the device 2.

Thereafter, the device 1 and the device 2 exchange additional information required for establishing connection of a different network interface and subsequently transmit and receive application data via the newly connected different network (S609).

Hereinafter, the EIR data format of FIG. 6 will be described in detail with reference to FIG. 7.

FIG. 7 is a view illustrating an example of a new extended inquiry response data format, proposed in this disclosure.

Referring to FIG. 7, the EIR data format may have a size of 240 octets and include a significant part and a non-significant part.

The significant part includes a sequence of EIR data structures, and each of the EIR data structures includes a length field having a size of 1 octet and a data field having a size of length octets.

The data field includes an EIR data type field having a size of n octets and an EIR data field having a size of length-n octets.

in the non-significant part, an EIR size may extend up to 240 octets, and every octet may be set to 0.

The messages (application inquiry, application response, application connection request, and application connection response) used in application discovery may be determined by a value set by the EIR data type.

Also, the device connection information, that is, the application information, the user information, the network information, and the content type information described above with reference to FIG. 6 may be included in the data field, in particular, in the EIR data field, of the EIR data structure.

Also, the EIR data field may further include advertising URI type, valid time stamp, advertiser name, advertising security flag, advertising URI type information.

The user information, information related to a user, may be a user ID, a name, user preference, and account information.

The service information, information related to a service, may be a service ID, an application ID, or cloud service provide information.

The network information may be Wi-Fi (e.g. SSID, channel information), Wi-Fi direct (Group ID), NFC, Bluetooth, and Ethernet.

The content information may be content type (video, picture, music, documents).

Table 2 illustrates an example of the EIR data type field of FIG. 7.

TABLE 2

| EIR Data Type Value | Category | Data Type Name | EIR Data Value Description |
|---|---|---|---|
| 0XA0 | Application Inquiry | | Used for indentifying EIR Data as for Application Inquiry |
| 0XA1 | Application Response | | Used for indentifying EIR Data as for Application Response |
| 0XA2 | Application Connection Request | | Used for indentifying EIR Data as for Application Connection Response |
| 0XA3 | Application Connection Response | | Used for indentifying EIR Data as for Application Connection Request |
| 0XA4 | Inquiry Type | | |
| 0XA5 | | Application | |
| 0XA6 | | User | |
| 0XA7 | | Network Interface | |
| 0XA8 | | Content Type | |
| | Application | | |

TABLE 2-continued

| EIR Data Type Value | Category | Data Type Name | EIR Data Value Description |
|---|---|---|---|
| 0XB0 | | Application Name | Name (e.g. Facebook, Dropbox, KaKao Talk |
| 0XB1 | | Application ID | App/service developer name (e.g. Google, Apple, LG) |
| 0XB2 | | Application Provider | |
| | User | | |
| 0XC0 | | User Name | User name |
| 0XC1 | | AccountID | accountid |
| 0XC2 | | UserID | Userid |
| 0XC3 | | ProfileID | Application defined profileid |
| | Network | | |
| 0XD0 | | Interface Name | Wi-Fi, Wi-Fi Direct, 3G, LTE, LTE-A |
| 0XD1 | | Connection Info | Interface Specific Information e.g. Wi-Fi SSID, Channel No., P2P Group ID |
| | Content Type | | |
| 0XE0 | | Message | Text Message |
| 0XE1 | | Picture | Picture File |
| 0XE2 | | Audio | Audio File |
| 0XE3 | | Video | Video File |
| 0XE4 | | Control | Control Data (Request/Response) |
| 0XE5 | | General Binary Data | Calendar, Tasks, Notes |

Table 3 illustrates an example of an application inquiry message format included in the EIR data field, and Table 4 illustrates an example of an application response message format included in the EIR data field.

TABLE 3

| Value | Note |
|---|---|
| 0X01 | Length of this Data |
| 0XA0 | Application Inquiry |
| 0X04 | Length of this Data |
| 0XA4 | Application |
| 0XA5 | User |
| 0XA6 | Network Interface |
| 0XA7 | Content Type |
| 0XE5 | End of Data (Not Transmitted over the air) |

TABLE 4

| Value | Note |
|---|---|
| 0X01 | Length of this Data |
| 0XA1 | Application Response |
| 0X0A | Length of this Data |
| 0XB0 | <<Application Name>> |
| 0X4C | 'L' |
| 0X47 | 'G' |
| 0X47 | 'G' |
| 0X61 | 'a' |
| 0X6C | 'l' |
| 0X6C | 'l' |
| 0X65 | 'e' |
| 0X72 | 'r' |
| 0X79 | 'Y' |
| 0X06 | Length of this Data |
| 0XC0 | <<User Name>> |
| 0X55 | 'U' |
| 0X73 | 's' |

TABLE 4-continued

| Value | Note |
|---|---|
| 0X65 | 'e' |
| 0X72 | 'r' |
| 0X23 | '2' |
| 0X04 | Length of this Data |
| 0XD0 | <<Interface Name>> |
| 0X57 | 'W' |
| 0X46 | 'F' |
| 0X44 | 'D' |
| 0X01 | Length of this Data |
| 0XE1 | <<Picture>> |
| 0XE5 | End of Data (Not Transmitted over the air) |

Referring to Table 3 and Table 4, an application exchanged between devices represents LG gallery, a user of a remote device desired to be connected is User2, a different network interface is Wi-Fi Direct, and content type desired to be shared is picture.

FIG. 8 is a view illustrating an example of an advertising message format, proposed in this disclosure.

A link layer has only a single packet format.

Thus, an advertising channel packet and a data channel packet has the same format.

The advertising channel packet may be expressed as an advertising channel PDU, an advertising message, and advertising data.

As illustrated in FIG. 8, the link layer packet format includes a preamble, an access address, a PDU, and a CRC.

First, the preamble has 1 octet, and the access address has a size of 4 octets. The PDU has a size ranging from 2 octets up to 39 octets. The CRC has a size of 3 octets.

The preamble is a part first transmitted in the advertising channel packet, and the access address, the PDU, and the CRC are sequentially transmitted after the preamble.

Hereinafter, the preamble, the access address, the PDU, and the CRC will be described in detail.

All the link layer packets have an 8-bit preamble.

The preamble is used in a receiver in order to perform frequency synchronization, symbol timing estimation, and automatic gain control (AGC) training.

Advertising channel packets have a preamble set to 10101010b.

A preamble of a data channel packet has a value of one of 10101010b and 01010101b dependent upon a least significant bit (LSB) of an access address. if the LSB of the access address is "1", the preamble is 01010101b, or otherwise, it is 10101010b.

The access address is an access address for every advertising channel packet and may be set to 10001110100001001101111101101010b (0x8E89BED6).

The access address may have a certain 32-bit value and may be generated by a device requesting a connection, that is, an initiating state, and transmitted through a connection request message.

The PDU may be named differently according to a channel in which the PDU is transmitted.

That is, when a specific packet is transmitted in an advertising physical channel, the PDU may be an advertising channel PDU, and when a specific packet is transmitted in a data physical channel, the PDU may be a data channel PDU.

The CRC is present as a 24-bit CRC at the last position of every link layer packet.

As illustrated in FIG. 8, the advertising channel PDU has a 16-bbit header and payload having various sizes.

The header includes a PDU type field, an RFU field, a TxAdd field, an RxAdd field, and a length field.

The PDU type field indicates a type of an advertising channel PDU.

The TxAdd field and the RxAdd field includes specific information in a PDU type individually defined in each advertising channel PDU.

In a case in which the TxAdd field or the RxAdd field are not defined as used in the given PDU, the TxAdd field or the RxAdd field are reserved for a future use.

The TxAdd field is a field indicating whether an address of an advertiser is public or random. For example, when the TxAdd field is set to 0, it may indicate that an address of an advertiser is public, an when the TxAdd field is set to 1, it may indicate that an address of an advertiser is random.

The RxAdd field is a field indicating whether an address of an initiator is public or random. For example, when the RxAdd field is set to 0, it may indicate that an address of an initiator is public, and when the RxAdd field is set to 0, it may indicate that an address of an initiator is random.

The length field indicates a length of payload.

Payload is specific to a PDU type in advertising channel PDUs.

Also, payload of advertising channel PDUs includes advertising data, and the payload is specific to a PDU type.

The payload included in the PDU includes an AdvA field and an AdvData field, and a size of each payload is different according to a PDU type.

That is, payload of the advertising channel PDUs may be ADV_IND PDU, ADV_NONCONN_IND PDU, or ADV_SCAN_IND PDU according to a PDU type.

Also, the ADV_IND PDU, ADV_NONCONN_IND PDU, and ADV_SCAN_IND PDU include an AdvA field and an AdvData field.

In detail, the AdvA field has a fixed size of 6 octets, while a size of the AdvData field is varied depending on a PDU type.

The AdvA field includes a public or certain device address of an advertiser indicated by the TxAdd, and the AdvData field includes advertising data. The AdvData field includes at least one length field and a data field.

The length field of the AdvData field indicates a length of advertising data, and the data field indicates advertising data.

The device connection information discussed above with reference to FIGS. 4 through 6 are included in payload of an advertising channel PDU, in particular, in the AdvData field.

FIG. 9 is a view illustrating an example of an advertisement or scan response data format, proposed in this disclosure.

As illustrated in FIG. 9, the advertisement or scan response data format includes a significant part and a non-significant part.

The significant part includes a sequence of AD structures, and the sequence includes at least one AD structure.

The non-significant part extends advertising data or scan response data up to 31 octets, and a value of every octet is set to 0.

One AD (advertising data) structure includes a length field having a size of 1 octet, and a data field having a size of length octets.

The length field indicates a size of an AD structure.

The data field includes an AD type field having a size of n octets, and an AD data field having a size of length-n octets.

The AD type field uses a value determined in an "assigned numbers document", and may include information as follows.

Service UUID (Universal Unique Identifier): it may have a different value by bits Local Name: Only one local name can be included Flags Manufacturer Specific Data: It indicates a company identifier code and manufacturer specific data.

TX Power level: It indicates a transmission power level of a packet and a TX power level value is determined according to distance.

Security Manager Out of Band (OOB): It indicates security-related information during a device pairing process.

Security Manager TK (Temporal Key) Value: Security Manager is a software security management module of a host device and the security manager TK value indicates a security key value of the security manager Slave Connection Interval Range: It indicates a connection request transmission interval of a slave device.

Service Solicitation: It indicates a value used for requesting connection from a different device.

Service Data: It indicates a service UUID and associated data.

In order to exchange application pairing information, the AD type field value and the AD data field value included in the BLE advertising data and scan response data format may use the value of Table 2 in the same manner.

That is, the device connection information may be included in the data field, in particular, the AD data field, of the BLE advertising data and scan response data format.

FIG. 10 is a view illustrating an example of a packet structure including device connection information, proposed in this disclosure.

A packet structure including the device connection information may be a BLE or Bluetooth BR/EDR packet structure.

FIG. 10(a) illustrates an example of an ADV_IND PDU packet structure of a broadcasting mode, and FIG. 10(b) indicates an example of an ADV_IND PDU Packet of a unicasting mode.

As illustrated in FIG. 10(a), an advertising packet (ADV_IND PDU) of the broadcasting mode includes device connection information (application, user, network, content) in a data field of an AdvA data field.

Each information of the device connection information may be expressed as an application inquiry type value.

As illustrated in FIG. 10(b), an advertising packet (ADV_IND PDU) of the unicasting mode may include device connection information (application, user, network, content) in an application inquiry field of a PDU.

Header fields of FIGS. 10(a) and 10(b) may include a mode field indicating whether a mode is a broadcasting mode or a unicasting mode.

FIG. 11 is a view illustrating another example of a packet structure including device connection information, proposed in this disclosure.

FIG. 11(a) illustrates an example of a BCST_REQ structure, one of request packets used in Bluetooth communication, and FIG. 11(b) illustrates an example of a BCST_RSP structure, one of response packets used in Bluetooth communication.

As illustrated in FIG. 11(a), BCST_REQ includes advertising channel packet header, requester address, application Inquiry, control, control data, and requesting data type.

The device connection information discussed in FIGS. 4 through 6 may be included in the requesting data type field.

As illustrated in FIG. 11(b), BCST_RSP includes advertising channel packet header, response address, application response, control, and broadcast data.

The broadcast data field includes a length field and a data field, and has a structure in which one length field and one data field are repeated.

The data field includes the device connection information discussed above with reference to FIGS. 4 through 6, and may include one device connection information per data field.

That is, the data fields include an application type field and an application data field, a network interface field and a network interface data field, a user field and a user data field, and a content type field and a content type value field, FIG. 12 is a flow chart illustrating an example of a method for exchanging device connection information using a packet structure of FIG. 11.

Referring to FIG. 12, the device 1 performs an application discovery procedure with a plurality of remote devices using BLE.

Here, the device 1 is in a broadcasting mode in which a broadcasting advertising message can be transmitted, and a plurality of remote devices are in a scanning mode (or a scanning state) in which an advertising packet can be scanned.

That is, the device 1 transmits an ADV_IND message to the remote devices (device 2 to device N) (S1210).

The ADV_IND message may include Mode=Broadcasting, Inquiry type=Application, User, and Network I/F information.

Thereafter, the remote devices individually transmit a BCST_RSP message including application information of their own to the device 1 (S1220).

That is, the BCST_RSP message transmitted by the device 2 may include application information set as a value of 'LG SNS', user information set as a value of 'User 2', and network I/F information set as a value of 'Wi-Fi', for example.

Also, the BCST_RSP message transmitted by the device N may include application information set as a value of 'LG SNS', user information set as a value of 'User N', and network I/F information set as a value of 'Wi-Fi', for example.

Thereafter, the device 1 selects a remote device intended to be connected on the basis of the received BCST_RSP message, and transmits a BCST_RSP message including information of the device 1 to the selected remote device (device 2) (S1230).

The BCST_RSP message transmitted by the device 1 may include application information set as a value of 'LG SNS', user information set as a value of 'User 1', network I/F information set as a value of 'Wi-Fi', and network data, that is, an SSID (Service Set Identifier) set as a value of 'LG SNS', for example. The SSID may be a value indicating a name of a network.

Thereafter, the device 2 turns on or activates a network interface (Wi-Fi direct) different from Bluetooth communication in order to start application (LG SNS) data exchange with the device 1 (S1240).

Here, the remote devices which have failed to receive the BCST_RSP message from the device 1 cannot turn on the network interface which is turned on by the device 2, because they failed to obtain network interface information transmitted from the device 1.

Thereafter, the device 1 transmits and receives application data to and from the device 2 through the different network communication (Wi-Fi) (S1250).

FIG. 13 is a flow chart illustrating an example of a method for searching for a device and exchanging connection information using tethering, proposed in this disclosure.

As illustrated in FIG. 13, the device 1 and a device T are connected for wireless communication through tethering (S1301).

Tethering refers to a method for connecting an Internet accessible device using a Bluetooth wireless technology, a USB cable, and the like, and an IT device.

For example, an IT device such as a notebook computer, or the like, is connected to the Internet using a smartphone that can access the Internet like a modem.

Specifically, FIG. 13 illustrates a method in which the device T not available for Internet access searches for remote devices (device to device N) and exchanges connection information with corresponding remote devices using the device 1 available for Internet access.

The device 1 is a device available for Internet access and a host device, and the device T is a tethered device connected to the device 1 through tethering.

Also, the remote devices (device 2 to device N) are in a scanning state in which they can scan advertising packets.

First, the device T transmits the BCST_REQ message discussed above with reference to FIG. 12 to the device 1 through a tethered network interface (for example, Wi-Fi) (S1302).

The BCST_REQ message may include application set as a value of 'LG SNS', user information set as a value of 'User N', and network, interface information set as a value 'Wi-Fi'.

Thereafter, the device 1 transmits an ADV_IND message including the information received in step S1302 to the remote devices (S1303).

The ADV_IND message includes Mode=Broadcasting, Inquiry type=Application, User, and Network I/F information.

That is, the device 1 modifies information included in the received BCST_REQ message for a message format and transmits the modified message to the remote devices.

Thereafter, the remote devices individually transmit a BCST_RSP message including information of their own to the device 1 (S1304).

The BCST_RSP message may include application information, user information, and network I/F information.

Thereafter, the device 1 transmits the received BCST_RSP message received in step S1304 to the device T through tethering (S1305).

For example, the BCST_RSP message transmitted to the device T may include values set as Response=Application=LG SNS, User=User 1, Network I/F=Wi-Fi, Network Data=SSID=LG_SNS.

Thereafter, the device T selects a remote device with which the device T will share content, and turns on a different network interface (Wi-Fi direct) for sharing content (S1306).

Thereafter, the device T exchanges application data using the different network interface with the selected remote device (device 2) through the device 1 (S1307).

Here, the device 1 serves to relay data transmission and reception between the device T and the device 2.

FIG. 14 is a view illustrating an example of a user interface output from devices, proposed in this disclosure.

FIG. 14(a) illustrates the UI corresponding to step S503 of FIG. 5, illustrating a list of a plurality of remote devices output on a screen of the device 1 and a user action for selecting a specific remote device.

FIG. 14(b) illustrates the UI corresponding to steep S505 of FIG. 5, illustrating information of the device 1 output on screens of the remove devices and a screen for selecting connection acceptance or connection rejection regarding the connection request from the device 1.

In FIG. 14, content desired to be shared by the device 1 with a remote device may be a picture, a file, and SNS information.

Hereinafter, a method for exchanging Wi-Fi direct connection information (for example, an SSID or a group ID) using BLE, discovering a sink device in a Wi-Fi direct network (WFDN), and automatically performing handover on streaming to a different device will be described.

FIG. 15 is a flow chart illustrating a method for exchanging Wi-Fi direct connection information using Bluetooth and transmitting and receiving data and performing handover on streaming between devices via Wi-Fi direct, proposed in this disclosure.

Referring to FIG. 15, a source device 1 transmits a media stream to a sink device to play media through the sink device (S1501).

Here, the source device (SRC) may be a portable device such as a smartphone retaining content, and the sink device may be a device capable of receiving content from the source device and playing the received content. The sink device (SNK) may be a speaker or the like.

Thereafter, in order to be connected to a remote device, that is, a sink device, present nearby, the source device 2 broadcasts a BLE advertising message including network information and service information (for example, service IDs) of its own (S1502).

The BLE advertising message including the network information and service information may be implemented as follows.

---

```
<?xml>
    <NetworkApplicationAdvertisement>
        <BSSID>802.11 Wi-Fi Direct BSSID</BSSID> //
    Mandatory
        <P2PGroupID>802.11 Wi-Fi Direct GroupID</P2PGroupID>
    // Mandatory
        <DeviceID> Device Unique ID</DeviceID> // Optional
        <RequestID> Number of Request</RequestID> // Optional
        <SEID>Stream End Point ID</SEID> // Optional
            < MediaPlayerID > Media Player ID </
    MediaPlayerID> // Optional
        <SecurityType>WEP</SecurityType> // Optional
        <SecurityKey>WEPKey</SecurityKey> // Optional
    </ NetworkApplicationAdvertisement >
[Example NetworkApplicationAdvertisement of Wi-Fi Direct
through Bluetooth]
<?xml version="1.0" encoding="UTF-8"?>
< NetworkApplicationAdvertisement
name="WFDNetworkApplicationAdvertisement  ">
< NetworkApplicationAdvertisement
        BSSID = "WFDBSS"
        P2PGroupID = "WFDP2P"
        DeviceID = "00:02:72:00:d4:1a"
        RequestID ="002"
        SEID = "012345"
        MediaPlayerID ="02:01:06:03:02:F0:FF" >
    < NetworkApplicationAdvertisementCondition
        AutoPairing ="true"
        AutoStreamingHanodver ="true"
        StreamingStatusNotification = "true"
        NetworkConnection ="NFC|WLAN|Bluetooth ">
</ NetworkApplicationAdvertisement   >
```

---

That is, a network application advertisement may include DDI (device Information (device/interface address), device type, friendly name, manufacturer, model description, model name, UDN (UUID), service list, and the like.

Here, it is assumed that Bluetooth wireless functions of the source device 2 and adjacent remote devices (source device 1 and sink device) are active.

Thereafter, upon receiving the BLE advertising message, the remote devices (source device 1 and sink device) transmits a BLE response message including information of their own to the source device 2 (S1503).

After transmitting the BLE response message, the remote devices activates a network interface (Wi-Fi direct) requested by the source device 2.

Here, the information transmitted by the remote devices may be network information, user information, and service information.

Thereafter, the source device 2 selects a remote device to be connected on the basis of the received BLE response message, and performs a Wi-Fi direct device discovery procedure with the selected remote device (sink device) using Wi-Fi direct communication (S1504).

Here, before step S1504, a procedure related to permission of the use of the sink device from the source device 1 which currently uses the sink device may be added.

In step S1504, it is assumed that the use of the sink device is permitted from the source device 1.

That is, a procedure related to transfer authority to use a device may be added in FIG. 15.

After the Wi-Fi direct connection is established between the source device 2 and the sink device, the source device 2 selects media to be output to the sink device and transmits a stream of the selected media to the sink device (S1505).

Here, the source device 2 may transmit an SEID (Stream End Point Identifier) together with the selected media stream.

Hereinafter, a method for transmitting an advertising uniform resource identifier (URI) using Bluetooth and a method for strengthen security in accessing URI, proposed in this disclosure, will be described in detail.

That is, an advertising URI is quickly exchanged between devices through Bluetooth BR/EDR or BLE technology, for which a new advertising message format is defined, and a security protocol is newly defined in order to strengthen security in accessing an advertising URI.

An advertiser used hereinafter represents a device that broadcasts an advertising packet, which may also be expressed as an advertising device or a first device.

The advertiser may be various types of sensors, or the like, for example.

A scanner represents a device playing a central role, which may also be expressed as a second device. The scanner may be a smartphone, or the like, for example.

In the related art, an advertiser unilaterally transmits an advertising message (beacon, advertising packet, or advertising channel PDU) including an advertising URI.

Thus, when the scanner receives the advertising URI, the scanner has difficulty in determining whether the received advertising URI is safe URI or an unsafe spam URI, and thus, security is weak when the scanner accesses the advertising URI.

Thus, in this disclosure, a method for strengthening security related to an advertising URI through a new security protocol, that is, a method of exchanging a request message and a response message between devices is provided.

That is, when the scanner receives an advertising URI from an advertiser, the scanner requests security requirement related to the advertising URI from the advertiser, verifies validity of the advertising URI, and subsequently accesses the advertising URI, rather than directly accessing the received advertising URI.

In detail, an advertise security flag field is added to an advertising message format used in Bluetooth to support authentication regarding a server of the advertising URI or encryption of the advertising URI.

First, in a case in which the scanner receives the advertising URI from the advertiser, the scanner requests additional security information related to verification of validity of the advertising URI from the advertiser.

The additional security information may be an encryption key, a signature key, or an authentication certificate.

Next, according to the request for the additional security information from the scanner, the advertiser transmits an advertising packet including security information regarding the advertiser or an access server of the advertising URI to the scanner.

The advertising packet may include a secure URL, a certificate URL, or an HTTPS server URL.

The scanner checks security information included in the advertising packet and verifies validity of the security information, that is, the encryption key, the signature key, or the authentication certificate, and only when validity of the advertising URI is verified, the scanner obtains a specific server URI and accesses (or connects to) the specific server.

FIG. 16 is a flow chart illustrating an example of a method for strengthening advertising URI security using Bluetooth, proposed in this disclosure.

Referring to FIG. 16, the advertiser transmits an advertising message including service information such as service types, service URIs, and the like, and security feature supported by each of service URIs, using Bluetooth (S1601).

A 'message' used in this disclosure may be variously expressed such as a packet, a channel PDU, and the like.

The advertiser may include various types of advertising profiles in the advertising message and transmits the same.

The advertising profile may include an advertising service, an alert service, a connection service, and the like.

The advertising service may include notification URIs, reservation URIs, control Web URIs, A/V streaming URIs, and the like.

The alert Service may include alert level (No, Mild, High).

The connection service may represent a wireless connection function or a network interface such as LTE, BLE, Wi-Fi, BT BR/EDR.

Here, when an advertiser supports only the BLE wireless function, the advertiser may perform a GAP peripheral role, connectable mode, or advertise link loss service.

Thereafter, the scanner may select a specific service URI desired to access, among service URIs, on the basis of the received advertising message (S1602).

The service URIs may include, for example, bus stop URI, menu URI, rental car URI, exhibition URI, shopping URI, coupon URI, Web service URI, alert message URI, and the like.

In order to strengthen security regarding access to the selected service URI, that is, in order to confirm whether access to the selected service URI is safe, the scanner requests security requirement related to the selected service URI from the advertiser.

That is, in order to request security features of the selected service URI, the scanner transmits a scan request message to the advertiser.

The scan request message may include connection signature required to sign data and verify signatures of broadcaster, link encryption required, authentication of broadcaster required, and the like.

Thereafter, the advertiser transmits a scan response message including requested security features to the scanner (S1603).

That is, the scan response message may include certificates for a signature key, an authentication key, an encryption key, and a key of the advertiser, secure URIs, (e.g. https . . . ), and the like.

Thereafter, the scanner verifies whether the advertising URI received from the advertiser is safe using the keys of the advertiser and the certificate included in the received scan response message, and when the advertising URI is safe, the scanner accesses a server of a service provider through the advertising URI to thereby transmit and receive service specific data related to the advertising URI (S1604).

As for the server of the service provider, various servers may be provided according to supported services, and various servers may be configured as a single server or may be configured as a plurality of individual servers.

The server may include, for example, a bus stop info. server, a shopping retail server, an exhibition Server, a car control server, a weather server, a location server, a light control server, a fire alert server, a file alarm server, a meeting room reservation server, and the like.

In step S1602, in a case in which the advertiser transmits a connectable advertising message, the scanner and the advertiser may exchange a message to exchange a security key and perform a security-related setting in a connected state.

Here, the scanner should trust the advertiser in order to verify that certificates of the advertiser are valid in the Web server.

Also, in order for the scanner to check validity of the certificates of the advertiser, the advertiser needs to have valid certificate lists by frequently updating certificates or URIs of the certificates that can be transmitted to the scanner.

Table 5 illustrates an example of advertising URI data types included in an advertising message proposed in this disclosure.

Table 5 may also be used in Advertise URIs Request Type, GATT Service, GATT characteristics, GATT characteristic descriptors, and the like, as described hereinafter.

TABLE 5

| Advertising URI Type Value | Category | Data Type Name | Data Value Description |
|---|---|---|---|
| | Shopping | | |
| 0XA0 | | Shopping Mall | Name, Location, Address, . . . , of Shopping Mall |
| 0XA1 | | Retail Shop Information | Location, Name, Owner, . . . , of Shop |
| 0XA2 | | Retail Coupon codes | Coupon Information, Discount Information, . . . |
| 0XA3 | | Payment Service Provider | Payment Information, Payment Service Provider information, . . . |
| 0XA4 | | Restaurant Menu | Restaurant Menu Information, Multilanguage Select/Support Information |
| | Vehicle | | |

TABLE 5-continued

| Advertising URI Type Value | Category | Data Type Name | Data Value Description |
|---|---|---|---|
| 0XB0 | | Bus Stop | Bus Information and URI: Bus Management Sever URIs, Bus Stop Information, Prearranged Arrival Bus Information, Multilanguage Bus Stop Guidance Selection URI, Connected Bus Route Guidance URI, Taxi URI, . . . |
| 0XB1 | | Car Control | Car Management Server, Shuttle Bus Management Sever URI, Remote Management Server URI, . . . |
| 0XB2 | | Rental Car Information | Rental Car Web, Call, Event, Location (Parking Lot) |
| | Environmental | | |
| 0XC0 | | Weather | Server URIs |
| 0XC1 | | Temperature | Server URIs |
| 0XC2 | | Air Pollution | Server URIs |
| 0XC3 | | Fire Alarm | |
| | Location | | |
| 0XD0 | | Meeting Room | Asset Position and URI: Meeting Room Information (Position, Reserved Schedule, Subscriber, Number of People, Reservation Sever URIs) |
| 0XD1 | | Location Tracker | |
| | Device Control | | |
| 0XE0 | | LED Lighting | Lighting Control Server URI |
| 0XE1 | | Wireless Power Charger | Wireless Charging Pad Setting URI |
| | Exhibition | | |
| 0XF2 | | Exhibition Web Server | Museum, Conference Guidance Service URIs |
| 0XF3 | | Artifacts Number | Artifact Name, Position Number, Route Number, Floor Number |
| 0XF4 | | Artifacts Description | Artifact Voice/Video Guide URI |
| 0XF5 | | Artifacts Multimedia Guide | Artifact Multimedia (Voice/Video) Guide URI |

Advertising security modes defined in an advertising process using Bluetooth, advertising security types supported in each mode, and a new advertising message format (or structure) supporting the advertising security types will be described.

Table 6 illustrates an example of advertising security features (advertising security modes and advertising security types supported in each mode) included in an advertising message, scan response message, and the like.

TABLE 6

| LE Advertising Procedure | Advertise Security Type | Authorization required | Advertiser Authentication required | Service Provider URIs Authentication Required | Encryption required |
|---|---|---|---|---|---|
| LE Advertising Security Mode 1 | 1 No security | 0XA1 | X | X | X | X |
| | 2 Unauthenticated Advertising with encryption | 0XA2 | X | X | X | ○ |
| | 3 Authenticated Advertising with Advertising URI encryption | 0XA3 | X | ○ | X | ○ |
| | 4 Authenticated Advertising with Advertising URI encryption and Server Authentication | 0XA4 | X | ○ | ○ | ○ |
| LE Advertising Security Mode 2 | 1 Unauthenticated Advertising with data signing | 0XB1 | X | X | | ○ |
| | 2 Authenticated Advertising with data signing | 0XB2 | X | X | | ○ |

Referring to Table 6, two advertising security modes (advertising security mode 1 and advertising security mode 2) are present. The advertising security mode 1 has four advertising security types, and the advertising security mode 2 has two advertising security types.

An advertising message formats including the advertising security types will be described.

First, when an advertising security type supports encryption and an advertising URI is required to be encrypted, the advertising URI is encrypted by an advertiser encryption key and transmitted.

Here, the advertising security type may be set to 0xA2, 0xA3, or 0xA4 as illustrated in Table 6.

Here, an advertiser encryption key distribution field of an advertising security flag is set to 'enable', and an advertiser encryption key distribution URI may be included in a key distribution URIs field.

In a case in which the advertising security type supports authenticated advertising and advertiser authentication is required for an advertising URI, the advertising URI includes an advertising URI signature signed with an advertiser signature key.

Here, as illustrated in Table 6, the advertising security type may be set to 0xA3, 0xA4, or 0xB2.

Also, an advertiser signature key distribution field of the advertising security flag is set to 'enable', and an advertiser signature key distribution URI may be included in a key distribution URIs field.

Hereinafter, a method for changing and managing an advertising security type included in an advertising message will be described.

The scanner may request changing of an advertising security type by transmitting a SCAN_REQ message to an advertiser.

Here, when the advertiser receives a SCAN_REQ message requesting changing of the advertising security type from the scanner, the advertiser may add the advertising security flag to the advertising message to strengthen security related to an advertising URI.

That is, the advertiser transmits an advertising packet to the scanner according to the request for changing security (secure URL, certificate URL, HTTPS server URL, etc.) from the scanner.

Here, the advertiser broadcasts an encrypted signal that can be decrypted only by the paired scanner.

It is impossible to decrypt encrypted information transmitted from the advertiser by a device not paired with the advertiser.

Thus, the scanner checks encrypted security information received from the advertiser and verifies validity of a security key, a certificate, and the like, of the advertiser. When the security key or the certificate is valid, the scanner obtains a specific server URI and performs secure connection to the specific server.

Hereinafter, an advertising message format including security information related to an advertising URI will be described in detail.

A dedicated PDU type transmitting an advertising URI may be additionally defined in a PDU type field of an advertising channel PDU.

Table 7 illustrates an example of a PDU type field of an advertising message proposed in this disclosure.

TABLE 7

| PDU Type b3b2b1b0 | Note |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 1000 | ADV_IND_EXT |
| 1001 | ADV_NONCONN_IND_EXT |
| 1010 | ADV_URI_IND |
| 1100 | SCAN_REQ_ADV_URI |
| 1101 | SCAN_RSP_ADV_URI |

Details of the advertising message format may be referred to FIG. 8.

Information for the advertising URI and application discovery discussed above may be included in payload, in particular, in an AdvData field, of an advertising message.

Information for the application discovery is as follows.

User Information: User ID, Name, User Preference, Account Information

Service Information: Service ID, App ID, Cloud Service Provider Information

Network Information: W-Fi (e.g. SSID, Channel Information), Wi-Fi Direct (Group ID), NFC, Bluetooth, Ethernet Content: Content Type (Video, Picture, Music, Documents)

Also, the advertising URI may be information as follows.

Restaurant information and URI: Menu, App, payment information, coupling, etc.

Bus information and URI: Bus management server URIs, Bus Stop, number of buses at stops, arriving bus information.

Payment information server URIs: User ID, Name, User Preference, Account Information, Payment Server URIs Asset position and URI: Meeting room information (position, reserved schedule, subscriber, number of people, reservation server URIs)

Public information, security, fire alert notification and URIs: Alert type, URIs, alert level ("No Alert," "Mild Alert," "High Alert,"), Alert server URIs Museum, conference guidance service URIs: Artifact Name, Position Number, Route Number, Floor Number FIG. 17 is a view illustrating an example of an advertising message structure proposed in this disclosure.

Specifically, FIG. 17 illustrates an example of an ADV_NONCONN_IND message structure transmitted in case of a non-connectable and undirected advertising event among advertising messages of BLE.

A device (having a peripheral role) transmitting a connectable advertising message refers to a device which can be connected to a reception device upon receiving a connection request message from a reception device (scanner, having a central role, for example, a phone) therefrom.

A device transmitting a non-connectable advertising message refers to a device which cannot be connected to a reception device even though a connection request is received from the reception device.

An ADV_NONCONN_IND message of FIG. 17 has a structure of a message broadcast to inform the scanner about an advertising URI unilaterally by the advertiser.

In general, the advertiser does not support authentication of an advertising URI and authentication of the advertiser, but the advertiser may support an advertising security flag according to circumstances.

As illustrated in FIG. 17, an AdaV Data field of an ADV_NONCONN_IND message may include at least one Advertising URIs.

The at least one Advertising URIs may be a server URIs, app download URIs, user/network/content information URIs, and the like.

The at least one advertising URIs is included in a data field of the AdvA Data field.

The data field of the AdvA Data field includes an advertising URI type field, an advertising security type field, a valid time stamp field, an advertiser name field, an advertising URI field, an advertising security flag field, and a reserved field.

The advertising URI type field indicates a type of an advertising URI and may additionally include an encoding scheme (UTF-8, etc.) of an advertising URI, a protocol (http, Idap, um, etc.) of a protocol of an advertising URI.

The advertising security type field indicates a technology (Encryption, Advertiser Authentication, Service Provider URI Authentication, Encryption) required when accessing an advertising URI.

The valid time stamp field indicates an advertising message and a valid time of security information defined in the advertising security field of the advertising message.

The advertise security flag field has a size of 1 octet, and may include an advertiser encryption key distribution field, an advertiser ID key distribution field, an advertiser signature key distribution field, an advertiser certificate distribution field, and a target server certificate distribution field.

The distribution fields each have a size of 1 bit.

The distribution fields each indicate whether a URI for distributing an encryption key, an ID key, a signature key, and a certificate of an advertiser and a certificate of a target server has been set when an advertising URI is accessed.

Also, the advertiser encryption key distribution field, the advertiser ID key distribution field, an advertiser signature key distribution field, an advertiser certificate distribution field, and a target server certificate distribution field are sequentially positioned in bit values of the advertise security flag field.

The advertising security flag field indicates whether an advertiser supports security and a supported type of security, and a security function may be indicated by bits in 1 octet.

The advertiser encryption key distribution field is positioned in a first bit (bit 1) of the advertising security flag field.

When a link is encrypted by a link key after pairing between devices is finished through Bluetooth, the advertiser or the scanner may generate an encryption key and transfer the generated encryption key to the counterpart.

The advertising ID key distribution field is positioned in the second bit (bit 2) of the advertising security flag field.

The advertising signature key distribution field is positioned in the third bit (bit 3) of the advertising security flag field.

The advertising certificate distribution field is positioned in the fourth bit (bit 4) of the advertising security flag field.

The target server certificate distribution field is positioned in the fifth bit (bit 5) of the advertising security flag field.

For example, in a case in which authentication of the advertiser and URI authentication of the service provide are requested, the advertising security type may be set to '0xA4' as illustrated in Table 6, and the second bit (bit 2), the fourth bit (bit 4), and the fifth bit (bit 4) of the advertising security flag field are separately set.

FIG. 18 is a flow chart illustrating an example of a method for obtaining information of an advertising URI using an advertising message of FIG. 17.

In FIG. 18, a device 1 is an advertiser, a device 2 is a scanner, and a device 3 is an application server/cloud.

First, the device 1 to device 3 perform a procedure for discovering an application and an advertising URI by using BLE (S1801).

The device 1 is in a broadcasting mode, the device 2 is in a scanning state, and the device 3 is in a state in which it accommodates a device accessing through URI.

Also, in addition to Bluetooth communication, a specific network interface (for example, Wi-Fi) is enabled or activated to allow the device 3 to exchange data with a device accessing the device 3.

In detail, the device 1 transmits an ADV_NONCON-N_IND message including an advertising URI and security information.

The ADV_NONCONN_IND message may include values set to Mode=Broadcasting, Advertising URI Type=Restaurant Menu, Valid Time=thursday 2014.06.30, Advertiser Name=Korean Table, and Advertise Security Flag=None.

Since an advertising security flag is not set in the ADV_NONCONN_IND message, the device does not perform a security information exchange procedure for strengthening security of an advertising URI received from the device 1.

Thus, the device 2 selects an advertising URI on the basis of the received ADV_NONCONN_IND, and activates a network interface (for example, Wi-Fi) for accessing the selected advertising URI (S1802).

That is, the device 2 activates the Wi-Fi wireless function (S1803), starts an application in a Web browser, and accesses the selected advertising URI.

Thereafter, the device 2 exchanges application data with the device 2 through Wi-Fi communication (S1805).

The application data may include, for example, restaurant name, restaurant menu and its description language selection/change, coupon code, payment information, and the like.

In another example, in a case in which the advertising security flag is set in the ADV_NONCONN_IND message, the advertising security flag may include an advertiser encryption key distribution field, an advertiser ID key distribution field, an advertiser signature key distribution field, an advertiser certificate distribution field, and a target server certificate distribution field. In this case, the device 2 may obtain key distribution URI values corresponding to the key distribution fields set in the advertising security flag field by accessing the received advertising URI, that is, accessing the device 3.

FIG. 19 is a view illustrating another example of an advertising message structure proposed in this disclosure.

Specifically, FIG. 19 illustrates an example of an advertising message structure in which URI values of key distributions, which are included in the advertising security flag field discussed above with reference to FIG. 18, are included in an extended PDU.

As illustrated in FIG. 19, an advertising message further includes an extended PDU and an extended CRC field.

The extended PDU may have a size ranging from 0 to 256 octets, and the extended CRC field may have a size ranging from 0 to 3 octets.

The advertising message may be expressed as an ADV_NONCONN_IND_EXT message.

Like the ADV_NONCONN_IND, the ADV_NONCON-N_IND_EXT message is transmitted when a non-connectable undirected advertising event occurs.

The extended PDU includes a header extended length field and a data field. A length of the header extended length field is 8 bits.

The data field of the extended PDU includes a key distribution URI when each distribution field value is set in the advertising security flag field.

That is, the data field of the extended PDU includes a security key of an advertiser and URIs of a server distributing a certificate.

In a case in which the advertising security flag is set in the data field of the PDU, key distribution URIs are sequentially set to fit to the data field of the extended PDU according to the number and order of the set (enabled) key distribution bits.

For example, in a case in which values set in the advertising security flag of the data field of the PDU are an advertiser encryption key, an advertiser ID key, and an advertiser signature key, key distribution URIs included in the data field of the extended PDU may include an advertiser encryption key distribution URI, an advertiser ID key distribution URI, and an advertiser signature key distribution URI in sequence.

FIG. 20 is a flow chart illustrating an example of a method for obtaining advertising URI information through an advertising message structure of FIG. 19.

Specifically, FIG. 20 illustrates a case of using an advertising message including an extended PDU.

Steps S2002, S2003, S2005, and S2006 are the same as steps S1802 to S1805 of FIG. 18, and thus, a detailed description thereof will be omitted The device 1 transmits an ADV_NONCONN_IND_EXT message to the device 2 (S2001).

The ADV_NONCONN_IND_EXT may include values sets to Mode=Broadcasting, Advertise URI Type=Restaurant Menu, Valid Time=thru 2014.6.30, Advertiser Name=Korean Table, Advertising URI=www.koreanTable.com, Advertise Security Flag=enabled, Advertiser Encryption Key Distribution=set, Advertiser IdKey Distribution=set, Advertiser Signature Key Distribution=set, Advertiser Certificate Distribution=set, and Secure Server Connection by Advertising URI=set, for example.

After step S2003, the device 2 obtains keys and certificates of the advertiser regarding key distribution URIs included in the extended data field of the ADV_NONCON-N_IND_EXT message from the device 3 (S2004).

The keys of the advertiser may be an advertiser encryption key, an advertiser ID key, and an advertiser signature key, and the certificates may be an advertiser certificate and a secure server certificate.

Thereafter, the device 2 verifies the keys and the certificates received from the device 1 on the basis of the information received in step S2004 and the secure server certificates and the server URIs, and when validity is verified, the device 2 accesses a selected URI through Wi-Fi to thus exchange application data with the device 3 (S2005).

FIG. 21 is a view illustrating another example of an advertising message structure, proposed in this disclosure.

Specifically, FIG. 21 illustrates an example of an ADV_IND message structure.

The ADV_IND message has the substantially same structure as that of the ADV_NONCONN_IND message of FIG. 19, in which only information included in the advertising security field is different.

That is, the ADV_IND message includes an advertiser encryption key distribution field, an advertiser ID key distribution field, an advertiser signature key distribution field, an advertiser certificate distribution field, and a secure server connection by advertising URI field in the advertising Security field.

The secure server connection by advertising URI field indicates whether a server accessed through an advertising URI is safe.

FIG. 22 is a flow chart illustrating an example of a method for obtaining advertising URI information through an advertising message structure of FIG. 21.

The advertising message (ADV_IND message) of FIG. 22 is transmitted when a connectable and undirected advertising event occurs.

In FIG. 22, since the connectable advertising message is used, when the advertiser receives a request for security requirement from the scanner, the advertiser establish connection with the scanner and exchange security requirement (security key, certificate, server information, etc.) information by exchanging request and response messages.

Steps 2201 and S2205 are the same as steps S2001 and S2005 of FIG. 20, and thus, a detailed description thereof will be omitted and only a different part will be described.

After step S2201, the device 1 and the device 2 perform connection using BLUE.

In detail, the device 2 transmits a Connect_REQ message to the device 1 (S2202).

Thereafter, the device 1 and the device 2 perform a data channel establishing procedure (S2203).

Thereafter, the device 1 transmits a data channel PDU to the device 2 (S2204).

The data channel PDU includes an encryption key/signature key/Identification key/certificate of the device 1 and secure URI of app server (e.g. HTTPS) of device 3.

Thereafter, the device 2 checks validity of the keys/certificates and the secure server URI of the device 1 on the basis of the data channel PDU.

Upon checking, when the keys/certificates and the secure server URI of the device 1 are verified to be valid, the device 2 selects an advertising URI and accesses the selected advertising URI, that is, the device 3 through a different network interface, thus exchanging application data with the device 3 (S2205).

FIG. 23 is a view illustrating another example of an advertising message structure, proposed in this disclosure.

An ADV_IND_EXT message has the same structure as that of the ADV_NONCONN_IND_EXT message of FIG. 19.

Thus, the ADV_IND_EXT message includes key distribution URIs fields in a data field of an extended PDU.

FIG. 24 is a flow chart illustrating an example of a method for obtaining advertising URI information through an advertising message structure of FIG. 23.

Specifically, FIG. 24 illustrates a case of using an ADV_IND_EXT message including an extended PDU field.

Steps of FIG. 24 are substantially the same as those of FIG. 20, and thus, only a different part will be described.

As illustrated in FIG. 24, the device 1 transmits an ADV_IND_EXT message to the device 2 (S2401).

The ADV_IND_EXT message may include values set to Mode=Broadcasting, Advertise URI Type=Restaurant Menu, Valid Time=thru 2014.6.30, Advertiser Name=Korean Table, Advertising URI=www.koreanTable.com, Advertise Security Flag=enabled, Advertiser Encryption Key Distribution=set, Advertiser IdKey Distribution=set, Advertiser Signature Key Distribution=set, Advertiser Certificate Distribution=set, Secure Server Connection by Advertising URI=set, Extended PDU=Advertiser Keys, Certificates Distribution URIs, for example.

Thereafter, the device 2 verifies security of advertising URIs through network communication other than BLE used in steps S2401 to S2404.

In detail, after step S2401, the device 2 turns on a different network interface (Wi-Fi), starts an application through a Web browser, and accesses a server corresponding to a selected advertising URI, that is, the device 3 (S2403).

Thereafter, the device 2 obtains advertiser keys and certificates from the device 3 in order to verify validity of distribution URIs included in the extended PDU data field (S2404).

The advertiser keys may be an advertiser Encryption Key, an advertiser ID Key, and an advertiser signature key, and the certificates may be an advertiser certificate and a secure server certificate.

Thereafter, the device 2 verifies keys and certificates of the device 1, and verifies secure server certificates and server URIs.

Thereafter, when the validity is verified, the device selects an advertising URI and accesses the selected advertising URI through the Wi-Fi network interface. That is, the device 2 is connected to a server corresponding to the selected advertising URI, that is, the device 3.

Thereafter, the device 2 exchanges application data with the device 3 (S2405).

The application data may be, for example, a restaurant name, a restaurant menu and its description language selection/change, a coupon code, payment information, and the like.

FIG. 25 is a flow chart illustrating another example of a method for obtaining advertising URI information, proposed in this disclosure.

Steps S2501 to S2503 and S2505 are the same as steps S2201 to S2203 and S2205 of FIG. 22, and thus, a detailed description thereof will be omitted.

Specifically, FIG. 25 illustrates a method in which after a secure connection is established based on BLE between the device 1 and the device 2, the device 1 transmits key distribution URIs through data channels, respectively.

As illustrated in FIG. 25, after connection between the device 1 and the device 2 is completed, the device 1 separately transmits a first data channel including an advertiser's encryption key distribution, a second data channel including an advertiser's identification key distribution, a third data channel including a device 3 Server Encryption Key Distribution, and a fourth data channel including a certificate distribution or a server certificate URI of a device 3 to the device 2 (S2504).

Thereafter, the device 2 obtains a certificate of the device 3 by the server certificate URI, verifies a certificate of a server through the obtained certificate of the device 3, and exchanges application data with the device 3 through a different network interface (S2505).

FIG. 26 is a view illustrating another example of an advertising message structure, proposed in this disclosure.

Specifically, FIG. 26 illustrates an example of an ADV_URI_IND message structure, and here, the ADV_URI_IND message refers to a dedicated advertising message of an advertising URI.

A PDU type value of the ADV_URI_IND message may be set to '1010'.

As illustrated in FIG. 26, a data field of the ADV_URI_IND message may include key distribution URIs field.

That is, a key distribution URI corresponding to a distribution value set in the advertising security flag field is included.

In a case in which an advertising security flag is set in the data field of the ADV_URI_IND message, the key distribution URIs are sequentially set according to the number of set (enabled) key distribution bits.

For example, in a case in which the values set in the advertising security flag are an advertiser encryption key, an advertiser ID key, and advertiser signature key, an advertiser encryption key distribution URI, an advertiser ID key distribution URI, and an advertiser signature key distribution URI are sequentially included in the key distribution URIs field.

FIG. 27 is a flow chart illustrating an example of a method for accessing an advertising URI by a scanner, proposed in this disclosure.

Referring to FIGS. 27A and 27B, a scanner starts to scan (S2701), and performs scanning to receive an advertising message (S2702).

Thereafter, when the scanner receives an advertising message from an advertiser (S2703), the scanner determines whether of advertising URI included in the advertising message is valid (S2704).

In a case in which the advertising URI is determined to be valid, the scanner determines whether an advertiser security flag included in the advertising message has been set or enabled (S2705).

When the advertiser security flag has been set, the scanner transmits a connection REQ message to the advertiser to establish a new connection with the advertiser (S2706).

When the advertising URI is not valid in step S2704, the scanner scans an advertising message again.

Thereafter, the scanner receives keys and certificates of the advertiser set in the advertiser security flag (S2707). The keys and certificates of the advertiser may be an encryption Key, IdKey, and certificates.

Thereafter, the scanner verifies the received keys, certificates, and secure server URIs of the advertiser (S2708).

In a case in which the received keys, certificates, and secure server URIs of the advertiser are not verified, the scanner performs step S2702.

When the received keys, certificates, and secure server URIs of the advertiser are verified, the scanner determines whether an advertising URI has been encrypted (S2709).

When the advertising URI has been encrypted, the scanner decrypts the advertising URI using an encryption key of the advertiser (S2710).

Thereafter, the scanner determines whether the decrypted advertising URI is valid (S2711).

In a case in which the advertising URI has not been encrypted in step S2709, the scanner performs step S2711.

Here, when the decrypted advertising URI is valid, the scanner determines whether the advertising URI has been signed by the advertiser (S2712).

In a case in which the decrypted advertising URI is not valid, the scanner performs step S2702.

In a case in which the advertising URI has been signed by the advertiser, the scanner verifies a signature of the advertising URI by using an advertiser signature key (S2713).

Thereafter, the scanner determines whether the signature of the advertising URI is valid (S2714).

When the signature of the advertising URI is valid, the scanner turns on or activates a network interface (for example, Wi-Fi) to access the Internet (S2715).

In a case in which the advertiser security flag has not been set in step S2705, the scanner performs step S2715, that is, turns on the network interface.

Here, in a case in which the advertising URI has not been signed by the advertiser, the scanner performs step S2715.

Thereafter, the scanner starts application through a Web browser and accesses the advertising URI (S2716).

Thereafter, when a server supports the SSL TLS, the scanner verifies certificates of the server (S2717), and when the certificates of the server are verified, the scanner terminates scanning of the advertising message (S2718).

However, in a case in which the certificates of the server are not verified, the scanner scans an advertising message or performs the procedure of determining validity of the advertising URI again.

In another embodiment, the advertiser may transmit the advertising URI through an ADV_SCAN_IND message.

The ADV_SCAN_IND message is an advertising message which can be scanned and which is used when a broadcast advertising event occurs.

Here, the scanner may request advertising URI-related additional information from the advertiser through an SCAN_REQ_ADV_URI message.

Thereafter, the advertiser transmits a SCAN_RSP_ADV_URI message as a response with respect to the SCAN_REQ_ADV_URI message to the scanner to thereby inform the scanner that additional information (an advertiser security key, a certificate, server information, etc.) can be provided.

A structure of the ADV_SCAN_IND message is the same as that of the ADV_NONCONN_IND message, and thus, a detailed description thereof may be referred to FIG. 17.

In another embodiment, the advertiser may transmit an advertising URI through an ADV_SCAN_IND_EXT message.

As discussed above, an extended PDU of the ADV_SCAN_IND_EXT message may include key distribution URIs.

In a case in which an advertising security flag is set in the PDU of the ADV_SCAN_IND_EXT message, the key distribution URIs are sequentially set in the data field of the extended PDU according to the number of the set key distribution bits.

For example, in a case in which values set in the advertising security flag are an advertiser encryption key, an advertiser ID key, and an advertiser signature key, an advertiser encryption key distribution URI, an advertiser ID key distribution URI, and an advertiser signature key distribution URI may be included in the key distribution URIs in sequence.

A structure of the ADV_SCAN_IND_EXT message is the same as that of the ADV_NONCONN_IND_EXT message of FIG. 17, and thus, a detailed description thereof may be referred to FIG. 17.

FIG. 28 is a flow chart illustrating an example of a method for transmitting an advertising URI according to a request from a scanner, proposed in this disclosure.

Steps S2801 and S2804 to S2807 are the same as steps S2001 to S2005 of FIG. 20, and thus, a detailed description thereof will be omitted and only a different part will be described.

In order to allow an application and a URI to be discovered, a device 1 transmits an ADV_SCAN_IND message (or an ADV_SCAN_IND channel PDU) to a device 2 using BLE (S2801).

Here, the device 1 is an advertiser and the device is a scanner.

The ADV_SCAN_IND message may include values set to Mode=Broadcasting, Advertise URI Type=Restaurant Menu, Valid Time=thru 2014.6.30, Advertiser Name=Korean Table, Advertising URI=www.koreanTable.com, Advertise Security Flag=enabled, Advertiser Encryption Key Distribution=set, Advertiser IdKey Distribution=set, Advertiser Signature Key Distribution=set, Advertiser Certificate Distribution=set, Secure Server Connection by Advertising URI=set, for example.

Thereafter, in order to request advertising URI-related additional information, the device 2 transmits a SCAN_REQ_ADV_URI message to the device 1 (S2802).

Thereafter, in response to the SCAN_REQ_ADV_URI, the device 1 transmits a SCAN_RSP_ADV_URI message to the device 2 (S2803).

The advertising URI-related additional information may be a security key, a certificate, server information, and the like, related to the device 1 and/or the device 3.

Structures of the SCAN_REQ_ADV_URI and SCAN_RSP_ADV_URI messages will be described in detail with reference to FIGS. 29 and 30 hereinafter.

FIG. 29 is a view illustrating an example of a scan request message structure of FIG. 28.

In detail, FIG. 29 illustrates a structure of a SCAN_REQ_ADV_URI message.

The SCAN_REQ_ADV_URI message refers to a message transmitted by the scanner in order to request an advertising URI and additional information related to the advertising URI from the advertiser.

Here, the scanner is in a scanning state, and the advertiser is in an advertising state.

As illustrated in FIG. 29, the SCAN_REQ_ADV_URI message includes a preamble, an access code, a PDU, and a CRC (Cyclic Redundancy Check).

The PDU includes a header field, a ScanA field (6 octets), an AdvA field (6 octets), an advertise security request type field (10 octets), and an advertiser setting field.

Referring to Table 7, a PDU type value of the SCAN_REQ_ADV_URI message may be set to '1100'.

The ScanA field indicates an address of the scanner, and the AdvA field indicates an address of the advertiser.

In a case in which the TxAdd (1 bit) field value is set to '0', for example, it indicates that ScanA==public, and in a case in which the TxAdd (1 bit) field value is set to '1', it indicates that ScanA==Random.

Also, in a case in which the RxAdd (1 bit) field value is set to '0', for example, it indicates that AdvA==public, and when the RxAdd (1 bit) field value is set to '1', it indicates that AdvA==Random.

The advertise URIs request type (1 octet) field indicates type information of an advertising URI requested by the scanner from the advertiser.

Thus, upon receiving the advertise URIs request type value, when the advertiser supports an advertising security type, the advertiser may set an advertising security type in a SCAN_RSP_ADV_URI message and transmits the same to the scanner.

As another embodiment, a method for changing and managing an advertising URI security mode using an advertising security request type of the SCAN_REQ_ADV_URI message will be described.

That is, the scanner transmits the SCAN_REQ_ADV_URI message to the advertiser so that the advertise security type may be changed.

In a case in which the scanner sets an advertise security type set (1 bit) value of the advertiser setting of the SCAN_REQ_ADV_URI message and transmits the same to the advertiser and the advertiser supports the advertise security type requested by the scanner, the advertiser may change an advertising security mode according to the received advertise security request type.

That is, upon request from the scanner, the advertiser may add an advertise security flag requested by the scanner to an advertisement message to support strengthening of security of the advertising URI.

That is, the advertiser may include information regarding authentication regarding the advertiser, authentication regarding an access server (service provider) of the advertising URI, support of encryption of the advertising URI, and authentication of a signature of the advertising URI in the advertising security flag, and transmit the advertising security flag to the scanner, whereby security regarding the advertising URI can be strengthened.

The scanner interprets the advertising URI-related security information received from the advertiser, verifies validity of a security key, a certificate, and the like, and in a case in which the security key, the certificate, and the like, are valid, the scanner obtains a specific server URI and performs security connection to the corresponding server.

FIG. 30 is a view illustrating an example of a scan response message structure of FIG. 28.

Specifically, FIG. 30 illustrates an example of a SCAN_RSP_ADV_URI message structure.

The SCAN_RSP_ADV_URI message is a response message including advertising URI-related information and transmitted as a response with respect to the SCAN_REQ_ADV_URI message transmitted from the scanner.

As illustrated in FIG. 30, the SCAN_RSP_ADV_URI message includes a preamble, an access code, a PDU, and a CRC.

The PDU includes a header field, an AdvA field, and a ScanRspData field.

A PDU type of the SCAN_RSP_ADV_URI message may be set to '1101'.

Descriptions of the AdvA field, a TxAdd field, and a RxAdd field may be referred to FIG. 8.

A data field of the ScanRspData field may include advertise URI Type (1 octet), advertise security type, valid time stamp, advertiser name, advertising URI, advertising security flag (1 octet), and key distribution URIs (optional) fields.

Although respective drawings are divisionally described for convenience of description, the embodiments described in the respective drawings may be designed so as to be combined to implement a new embodiment. When necessary, design of a recording medium readable by a computer in which a program to execute the above-described embodiments is recorded may fall within the scope of the appended claims and their equivalents.

As for the method for providing a wireless docking service according to the present disclosure, the configuration and method according to the embodiments of the present disclosure described above are not limited in its application, but the entirety or a portion of the embodiments may be selectively combined to be configured into various modifications.

In the embodiments of the present invention, the method for transmitting and receiving data according to the present disclosure may be implemented as codes that can be read by a processor provided in a network device in a recording medium. The processor-readable recording medium may include any type of recording devices in which data that can be read by the processor is stored. The processor-readable recording medium may include a ROM, a RAM, a CD-ROM, a magnetic tape, a floppy disk, an optical data storage device, and the like. The processor-readable medium also includes implementations in the form of carrier waves or signals, e.g., transmission via the Internet. The processor-readable recording medium may be distributed over network-coupled computer systems so that the processor-readable code may be stored and executed in a distributed fashion.

Specific exemplary embodiments have been described. However, the present disclosure is not limited to the specific exemplary embodiments and various modifications may be made without departing from the scope of the present invention claimed in the claims, and such modifications should not be individually understood from technical concepts or prospects of the present disclosure.

Further, although the disclosure has described both product inventions and process inventions, description of both inventions may be complementarily applied as needed.

INDUSTRIAL APPLICABILITY

In the present disclosure, the method for transmitting and receiving data and an apparatus for performing the same are used in a wireless communication system.

The invention claimed is:

1. A method for transmitting and receiving data by a first device in a wireless communication system, the method comprising:
    transmitting a first message including device connection information to at least one second device via a first network;
    receiving a response with respect to the first message from the at least one second device via the first network;
    transmitting a connection request message for requesting wireless connection of a second network to the at least one second device via the first network on the basis of the response, the connection request message including information regarding connection of a network indicating the second network;
    receiving a connection response message corresponding to a response with respect to the connection request message from the at least one second device via the first network; and
    transmitting and receiving data to and from a second device via the second network,
    wherein the device connection information includes at least one of network information indicating a network supported by the first device, service information indicating a service desired to be shared, content type information indicating a content type of the service desired to be shared, or user information indicating information related to a user.

2. The method of claim 1, wherein the first network is Bluetooth, and the second network is a wireless network other than Bluetooth.

3. The method of claim 1, wherein the first message is an inquiry message of a Bluetooth basic rate (BR)/enhanced data rate (EDR), or an advertising channel packet data unit (PDU) of Bluetooth low energy (BLE).

4. The method of claim 1, wherein the first device transmits and receives a message to and from the at least one second device through tethering, and transmits and receives data to and from the second device.

5. The method of claim 1, wherein the first message further includes at least one advertising uniform resource identifier (URI) or at least one of pieces of security information related to the at least one advertising URI.

6. The method of claim 5, further comprising:
    receiving a second message requesting additional security information related to the at least one advertising URI from the at least one second device; and
    transmitting a third message including the requested additional security information to the at least one second device.

7. The method of claim 6, wherein the second message includes an advertising security request type field.

8. The method of claim 6, wherein the third message includes an advertising security flag field and an advertising security type field.

9. The method of claim 8, wherein when a plurality of key distribution fields are included in the advertising security flag field, the third message by the number corresponding the number of the key distribution fields is transmitted, and
    the third messages include the key distribution fields, respectively.

10. The method of claim 5, wherein the first message is transmitted when a connectable and undirected advertising event occurs or when a non-connectable and undirected advertising event occurs.

11. The method of claim 10, wherein when the first message is transmitted as the connectable and undirected advertising event occurs, the security information relates to the at least one advertising URI is exchanged after connection with the second device is established.

12. The method of claim 5 wherein the security information related to the at least one advertisement URI includes at least one of an advertising URI type field, an advertising security type field, a valid time stamp field, an advertiser name field, and an advertising security flag field.

13. The method of claim 12, wherein the advertising security flag includes at least one of an advertiser encryption key distribution field, an advertiser ID key distribution field, an advertiser signature key distribution field, and a target server certificate distribution field.

14. The method of claim 13, wherein the first message further includes an extended PDU and an extended CRC, and
    the extended PDU further includes at least one key distribution URI.

15. The method of claim 1, wherein the first device is an advertiser, and the second device is a scanner.

16. A device, as a first device, in a method for transmitting and receiving data in a wireless communication system, the device comprising:
    a communication unit configured to transmit and receive a signal to and from the external wiredly and/or wirelessly; and
    a control unit functionally connected to the communication unit,
    wherein the control unit performs control to transmit a first message including device connection information to at least one second device via a first network, receive a response with respect to the first message from the at least one second device via the first network, transmit a connection request message for requesting wireless connection to a second network to the at least one second device via the first network on the basis of the response, receive a connection response message corresponding to a response with respect to the connection request message from the at least one second device via the first network, and transmit and receive data to and from a second network via the second network, wherein the device connection information includes at least one of network information indicating a network supported by the first device, service information indicating a service desired to be shared, content type information indicating a content type of the service desired to be shared, and user information indicating information related to a user, and wherein the connection request message includes information regarding connection of a network indicating the second network.

17. The device of claim 16, wherein the first message further includes at least one advertising uniform resource identifier (URI) or at least one of pieces of security information related to the at least one advertising URI.

18. The device of claim 17, wherein the control unit receives a second message requesting additional security information related to the at least one advertising URI from the at least one second device, and transmits a third message including the requested additional security information to the at least one second device.

\* \* \* \* \*